United States Patent
Lee et al.

(10) Patent No.: US 12,470,425 B2
(45) Date of Patent: Nov. 11, 2025

(54) METHOD AND DEVICE FOR MULTIPLE CONTROL OF IOT DEVICE ON BASIS OF C2C ACCOUNT LINKAGE IN WIRELESS LAN SYSTEM IN SMART HOME ENVIRONMENT

(71) Applicant: LG ELECTRONICS INC., Seoul (KR)

(72) Inventors: Byungjoo Lee, Seoul (KR); Jeonghwan Kim, Seoul (KR); Youngjun Jo, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 193 days.

(21) Appl. No.: 18/253,893

(22) PCT Filed: Nov. 25, 2021

(86) PCT No.: PCT/KR2021/017479
§ 371 (c)(1),
(2) Date: May 22, 2023

(87) PCT Pub. No.: WO2022/119232
PCT Pub. Date: Jun. 9, 2022

(65) Prior Publication Data
US 2024/0007323 A1 Jan. 4, 2024

(30) Foreign Application Priority Data

Dec. 3, 2020 (KR) .................. 10-2020-0167639
Dec. 17, 2020 (KR) .................. 10-2020-0177609

(51) Int. Cl.
*H04L 12/28* (2006.01)
*H04W 84/12* (2009.01)

(52) U.S. Cl.
CPC ...... *H04L 12/2832* (2013.01); *H04L 12/2807* (2013.01); *H04L 12/2816* (2013.01); *H04L 2012/2841* (2013.01); *H04W 84/12* (2013.01)

(58) Field of Classification Search
CPC ......... H04L 2012/2841; H04L 12/2832; H04L 12/2816; H04L 12/2807; H04W 84/12
See application file for complete search history.

(56) References Cited

U.S. PATENT DOCUMENTS 9,860,963 B2 * 1/2018 Lawrenson ............ H05B 45/20
10,382,401 B1 * 8/2019 Lee ........................ H04L 63/166
(Continued)

FOREIGN PATENT DOCUMENTS

KR 10-2013-0070863 6/2013
KR 10-1555678 9/2015
(Continued)

OTHER PUBLICATIONS

Kazim et al., "A framework for orchestrating secure and dynamic access of IoT services in multi-cloud environments", Oct. 16, 2018, IEEE Publishing.*

(Continued)

*Primary Examiner* — Todd L Barker
(74) *Attorney, Agent, or Firm* — LEE, HONG, DEGERMAN, KANG & WAIMEY

(57) ABSTRACT

Proposed are a method and a device for multiple control of an IoT controlee device on the basis of C2C account linkage in a wireless LAN system in a smart home environment. Specifically, a first control device connects to a first cloud on the basis of a first account. A first control device receives commissioning information of a second control device for the controlee device on the basis of a connection between the first cloud and a second cloud. The first control device adds commissioning to the controlee device on the basis of the (Continued)

commissioning information. The second control device is connected to the second cloud on the basis of a second account. The first account and the second account are linked with each other.

12 Claims, 30 Drawing Sheets

(56) References Cited

U.S. PATENT DOCUMENTS

| | | | |
|---|---|---|---|
| 11,303,625 B2* | 4/2022 | Hu | G06F 21/30 |
| 2014/0282938 A1* | 9/2014 | Moisa | H04L 63/08 |
| | | | 726/6 |
| 2015/0012977 A1* | 1/2015 | Huh | H04L 63/08 |
| | | | 726/4 |
| 2016/0270193 A1* | 9/2016 | Lawrenson | H05B 47/1995 |
| 2017/0208118 A1 | 7/2017 | Luc et al. | |
| 2022/0070147 A1* | 3/2022 | Iqbal | H04L 63/0281 |

FOREIGN PATENT DOCUMENTS

| | | |
|---|---|---|
| KR | 10-2018-0039980 | 4/2018 |
| KR | 10-1980039 | 5/2019 |

OTHER PUBLICATIONS

Mala et al., "A framework for preserving datga security in hybrid cloud environment using trusted multiple cloud service providers", 2014 Sixth IInternational Conference on Advanced Computing, Aug. 31, 2015.*
Lee et al., "Cloud Service broker portalL Main entry point for multi cloud service providers and consumers", 16th International Conference on Advanced Communication Technology, Feb. 16, 2014.*
PCT International Application No. PCT/KR2021/017479, International Search Report dated Feb. 24, 2022, 3 pages.

* cited by examiner

FIG. 1
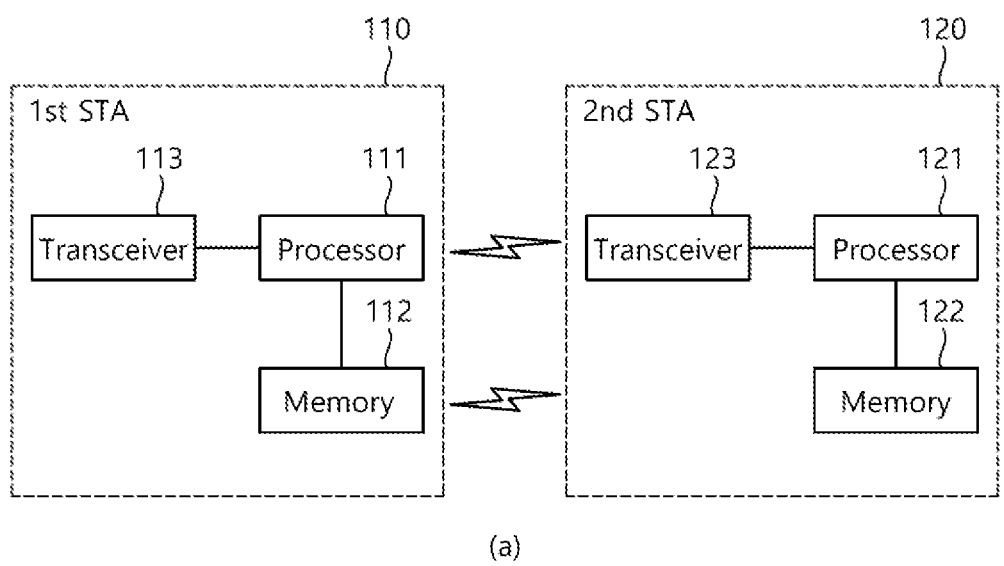
(a)
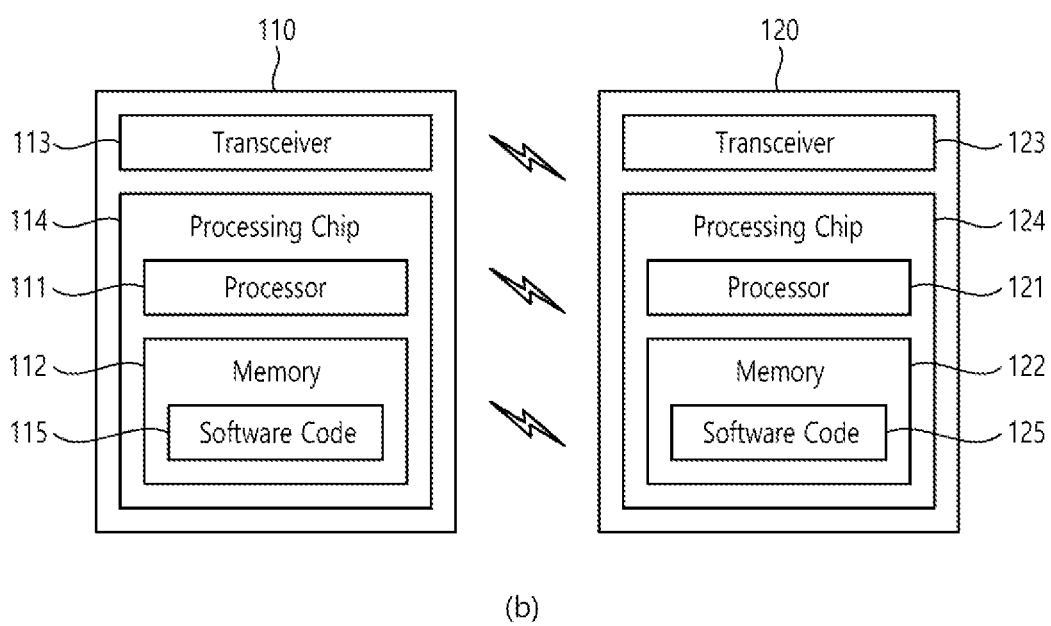
(b)

FIG. 2
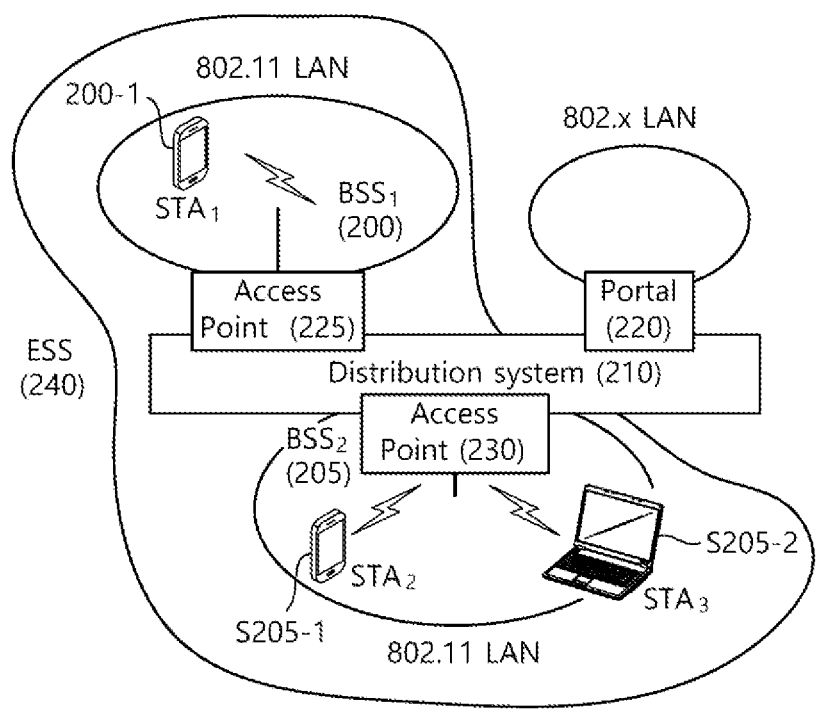
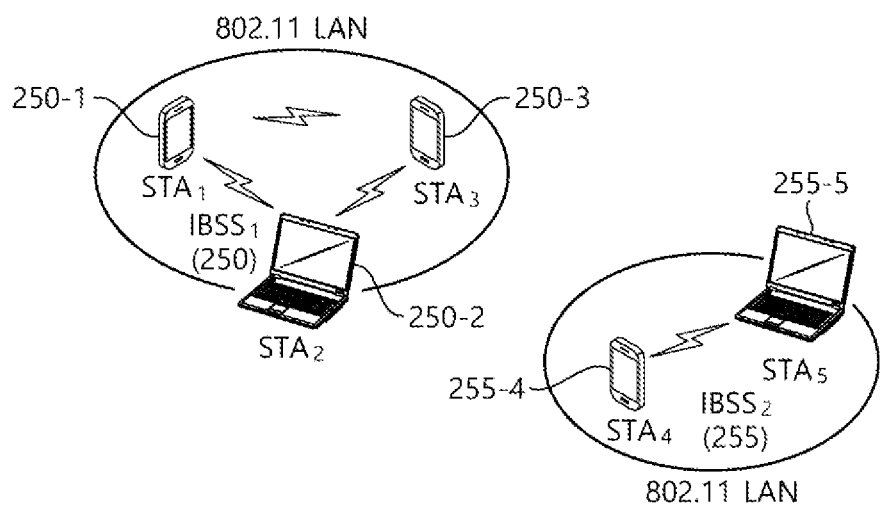

FIG. 16

```
"directive": {
    "header": {
        "namespace": "Alexa.ChipDiscovery",
        "name": "Discover",
        "messageId": "<message id>",
        "payloadVersion": "X"
    },
    "payload": {
        "scope": {
            "type": "BearerToken",
            "token": <access token>
        }
    }
}
```

FIG. 17

```
"event": {
    "header": { ... },  # Header Information is same with the Request message
    "payload": {
        "endpoints": [
        { ... },    # Endpoint information (CHIP Device Information including
        Endpoint/UUID, VID, PID)
        "displayCategories": ["LIGHT"],    # it will be defined in CHIP data model
        "capabilities": [
            { "properties": {              # device property
                "supported": [
                    { "name": "powerState" }            ],
                "proactivelyReported": true,
                "retrievable": true
                }
            }
            "connections": [                # connection information if need
            { "type": "TCP_IP",
                "macAddress": "00:11:22:AA:BB:33:44:55"
            } ]
}
```

FIG. 19

```
"directive": {
    "header": {
        "namespace": "Alexa.ChipPowerController",
        "name": "TurnOn",
        "messageId": "<message id>",
        "correlationToken": "<an opaque correlation token>",
        "payloadVersion": "3"
    },
    "endpoint": {
        "scope": {
            "type": "BearerToken",
            "token": "<an OAuth2 bearer token>"
        },
        "endpointId": "<endpoint id>",
        "cookie": {}
    },
    "payload": {}
}
```

FIG. 20

```
"event": {
   "header": {
      "namespace": "Alexa",
      "name": "Response",
      ...
   },
   "endpoint": {
      "scope": { ... },   # Token Value
      "endpointId": "<endpoint id>"
   },
   "payload": {}   #empty
},
"context": {
   "properties": [
      {
         "namespace": "Alexa.ChipPowerController",
         "name": "powerState",
         "value": "ON",
         "timeOfSample": "2017-02-03T16:20:50.52Z"
         "uncertaintyInMilliseconds": 500
      }
   ]
}
```

FIG. 22

```
{
    "name": "string",
    "vendorId": "string",
    "endpoint": {
        "uri": "string",
        "authorization": { ... }   #Authorization Info
    }
}
```

FIG. 23

```
"requestId":"aaaa-bbbb-cccc-example",
"timestamp":"2020-01-07T23:08:13Z",
"eventName":"AlexaDevelopmentEvent.ManifestUpdate",
"payload": {
   "properties": [
      {
         "namespace": "Alexa.ChipPowerController",
         "name": "powerState",
         "value": "ON",
         "timeOfSample": "2017-02-03T16:20:50.52Z",
         "uncertaintyInMilliseconds": 500
      }
   ]
}
```

METHOD AND DEVICE FOR MULTIPLE CONTROL OF IOT DEVICE ON BASIS OF C2C ACCOUNT LINKAGE IN WIRELESS LAN SYSTEM IN SMART HOME ENVIRONMENT

CROSS-REFERENCE TO RELATED APPLICATIONS

This application is the National Stage filing under 35 U.S.C. 371 of International Application No. PCT/KR2021/017479, filed on Nov. 25, 2021, which claims the benefit of earlier filing date and right of priority to Korean Application Nos. 10-2020-0167639, filed on Dec. 3, 2020, and 10-2020-0177609, filed on Dec. 17, 2020, the contents of which are all hereby incorporated by reference herein in their entireties.

TECHNICAL FIELD

The present specification relates to a method for setting IoT devices in a wireless LAN system in a smart home environment, and more particularly, to a method and apparatus for multi-controlling IoT devices based on C2C account linkage.

BACKGROUND

Amazon, Apple, Google and the Zigbee Alliance today announced anew joint working group to advance the development and adoption of a new, royalty-free connectivity standard that increases compatibility among smart home products and embeds security into fundamental design principles. IKEA, Legrand, NXP Semiconductors, Resideo, Samsung SmartThings, Schneider Electric, Signify (Philips Hue), Silicon Labs, Somfy, Wulian, and ThinQ (LG Electronics) etc., which constitute the board of directors of the Zigbee Alliance will also join the joint committee and contribute to the project toward a common goal.

The goal of the Connected Home over IP project is to simplify development for manufacturers and increase compatibility for consumers. The project is based on the common belief that smart home devices must ensure security, stability and seamless usability. The project aims to enable communication between smart home devices, mobile apps, and cloud services based on the Internet Protocol (IP), and to define a set of specific IP-based networking technologies for device authentication.

An industry joint committee adopts an open source approach in the development and implementation of new integrated connectivity protocols. The project will utilize market-proven smart home technologies from Amazon, Apple, Google, and the Zigbee Alliance. The decision to leverage these technologies is expected to accelerate the protocol development process and deliver benefits quickly to manufacturers and consumers.

The project aims to simplify the creation of devices compatible with smart homes and voice-recognition services such as Amazon's Alexa, Apple's Sin, and Google's Assistant for device makers. The forthcoming protocol will complement existing technologies, and the Joint Committee members encourage device manufacturers to continue to pursue innovations based on existing technologies.

The Connected Home over IP project encourages device manufacturers, silicon providers and developers in the smart home industry to participate in and contribute to standards development.

SUMMARY

This specification proposes a method and apparatus for multi-controlling IoT devices based on C2C account linkage in a wireless LAN system in a smart home environment.

An example of the present specification proposes a method for multi-controlling IoT devices based on C2C account linkage.

This embodiment proposes a method for controlling IoT devices by a plurality of IoT controllers through C2C (Cloud-to-Cloud) account linkage in a smart home environment. The first and second controller described below may correspond to the IoT controller device, and the controlee may correspond to the IoT device. In particular, the controlee is a device that supports only D2D (Device-to-Device), and the first or second controller may commission the controlee based on a D2D connection according to the CHIP standard. This embodiment proposes a method in which the second controller is first registered with the controlee, and the first controller is additionally registered with the controlee according to the CHIP standard through C2C account linkage.

A first controller connects to a first cloud based on a first account.

The first controller receives commissioning information for a controlee of a second controller based on a connection between the first cloud and a second cloud.

The first controller adds commissioning for the controlee based on the commissioning information.

The second controller is connected to the second cloud based on a second account. In addition, the second controller first commissions the controlee based on a CHIP standard and has a right to control the controlee first. The commissioning information for the controlee of the second controller is information required to add the first controller as a new administrator (admin/controller) of the controlee. The first controller may secondly have the right to control the controlee by adding commissioning for the controlee based on the commissioning information.

Specifically, the first controller may receive a permission message for access control of the controlee from the second controller. The first controller may control the controlee by executing an application based on the permission message. The first controller may be set as a second manager of the controlee, and the second controller may be set as a first manager of the controlee.

The permission message may include information that the first controller receives the same authority for access control as the second controller or information that the first controller receives authority for access control set by the second controller. For example, the second controller may differentially grant authority for access control to the first controller with information such as AC (Access Category).

A description of the connection between the first and second clouds is as follows. The first and second accounts are linked with each other. That is, since the first and second accounts are linked, even if the first and second clouds are clouds built by different vendors (for example, the first cloud may be built by a first manufacturer, the second cloud may be built by a second manufacturer), the first and second clouds may be connected to each other through account linkage. As the first and second accounts are linked, it may be confirmed that a user of the first controller and a user of the second controller are the same person. The first and second accounts may be linked based on issuance of an access token and a refresh token.

According to the embodiment proposed in this specification, a multi-manager setting method in which a plurality of controller control controlees through C2C account linkage is proposed, and there is an effect that a specific controller can quickly search for and connect other controllers and controlees within one network to implement various convenience functions for IoT devices.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 10 shows an operation when there is C2C Account Linking.

FIG. 16 shows an example of a Device Discovery Request message.

FIG. 17 shows an example of a Device Discovery Response message.

FIG. 19 shows an example of a Device Control Request message.

FIG. 20 shows an example of a Device Control Response message.

FIG. 22 shows an example of an Event Subscription Request message.

FIG. 23 shows an example of an Event/Notification message.

DETAILED DESCRIPTION

Figure 3:
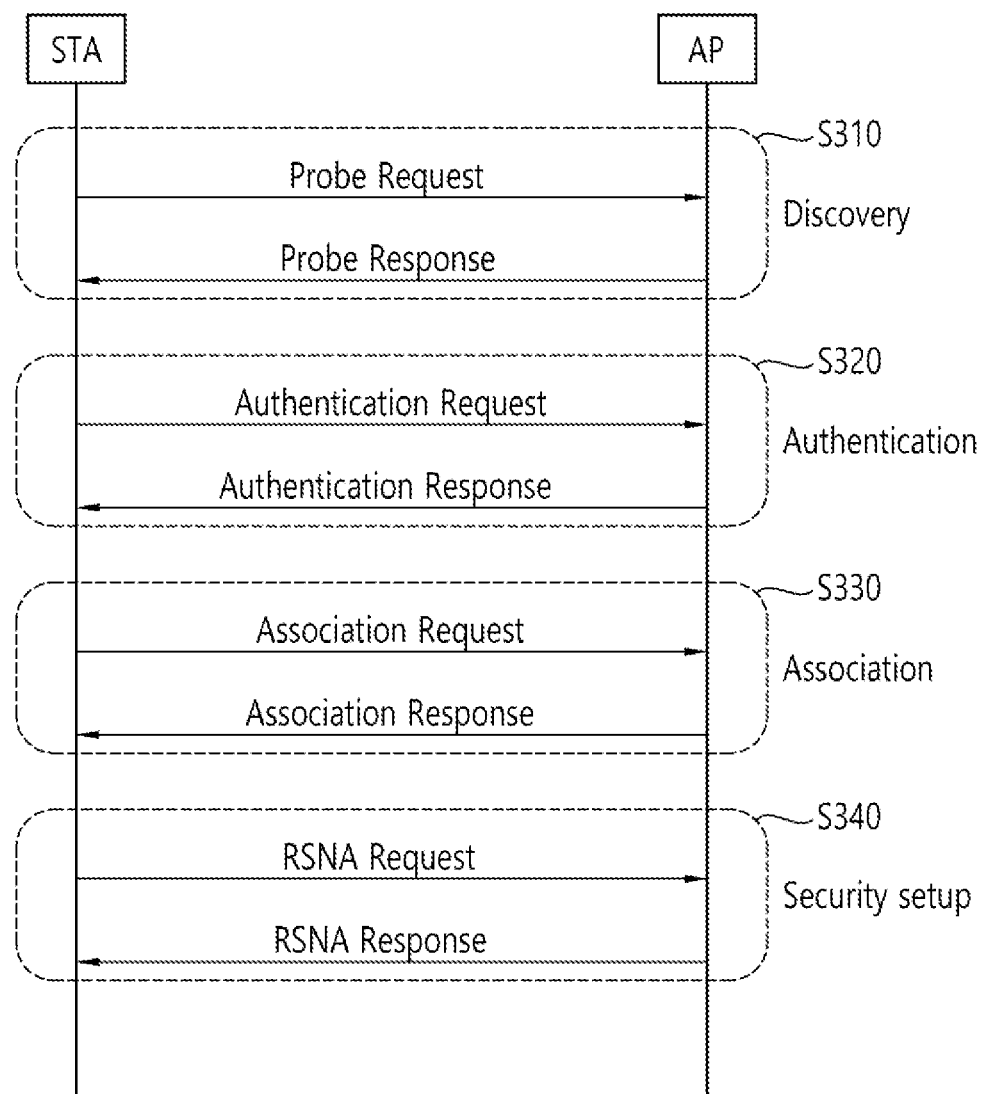
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3 rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (S SID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (S SID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

1. Zigbee and Connected Home Over IP (CHIP)

<Necessity of Zigbee>

Currently, there are standards for data such as voice, PC LANs, and video, but there are no wireless network standards to meet the specific needs of sensors or control devices. Sensors and control devices do not require high frequency bandwidth, but require short latency and low energy consumption for long battery life and a wide array of devices.

Today, various wireless communication systems that do not require high data rates and can operate at low cost and with low power consumption are being produced.

Products produced in this way are manufactured without standards, and eventually these past products cause compatibility problems with each product, as well as compatibility with new technologies.

<About Zigbee>

ZigBee is a high-level communication protocol using small, low-power digital radios based on IEEE 802.15.4-2003. IEEE 802.15.4-2003 is a standard for short-range personal wireless communication networks such as lamps, electronic meters, and consumer electronics that use short-range radio frequencies. ZigBee is mainly used in RF (Radio Frequency) applications that require low data rates, low battery consumption, and network safety.

<Features of Zigbee>

1) Low power consumption, simple implementation
2) Can be used for months or years on a single battery charge
3) It has an active mode (receive, transmit) and a sleep mode.

4) Device, installation, maintenance, etc. are all possible at relatively low cost
5) Safety (Security)
6) Reliability
7) Flexibility
8) Very small protocol stack
9) Interoperable and usable anywhere
10) High node density per network (ZigBee's use of IEEE 802.15.4 makes it possible to handle many devices in a network. This feature allows for massive sensor arrays and network control)
11) Simple protocol, implemented internationally (The size of the ZigBee protocol stack code is only about a quarter of the size of Bluetooth or 802.11.)

<Fields of Use of Zigbee>

Zigbee is currently used in fields such as industrial control, embedded sensors, medical data collection, fire and theft, building automation, and home automation.

1) Smart Energy

Smart Energy provides utilities/energy service providers with a secure and easy-to-use home wireless network to manage energy. Smart Energy gives utilities/energy service providers or their customers direct control of thermostats or other associated devices.

2) Home Entertainment and Control

Smart power, advanced temperature control system, safety and security, movies and music 3) Home Recognition System Water temperature sensor, power sensor, energy monitoring, fire and theft monitoring, smart devices and access sensors 4) Mobile Service Mobile payment, mobile monitoring and control, mobile security and access control, mobile healthcare and remote support 5) Commercial Buildings Energy monitoring, air conditioning, lighting, access control 6) Industrial Factories Process control, material management, environment management, energy management, industrial device control, M2M communication <Zigbee Device Type>

Figure 4:
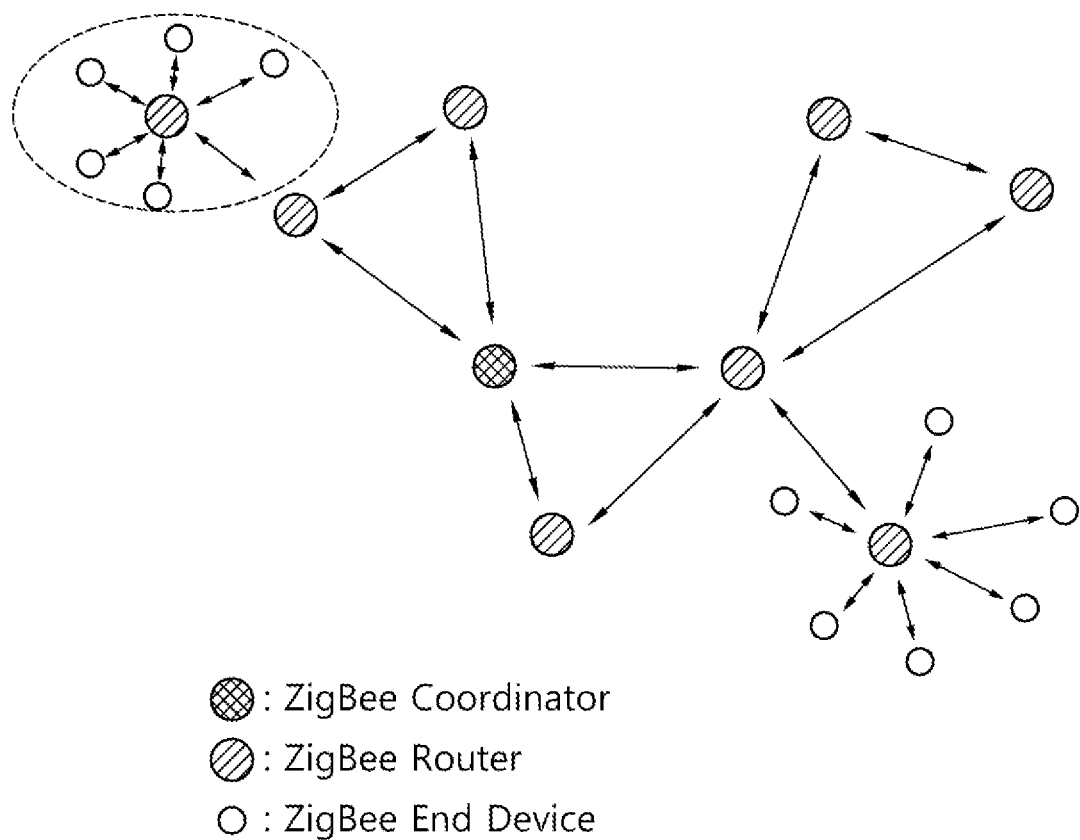
FIG. 4 shows Zigbee device types.

FIG. 4 shows Zigbee device types.

There are three types of Zigbee devices as shown in FIG. 4.

1) Zigbee COORDINATOR

It forms a network with the most important devices and connects them to other networks. Each network has only one coordinator. The ZigBee coordinator can store information about the network and also serves as a trust center or storage for security keys.

2) Zigbee Router

A router can function not only as an application function, but also as a writer that can forward data from other devices.

3) Zigbee End Device

ZigBee end devices include the ability to communicate with parent nodes. This relationship allows the node to wait a long time, extending battery life even further.

<Zigbee Stack>

Figure 5:
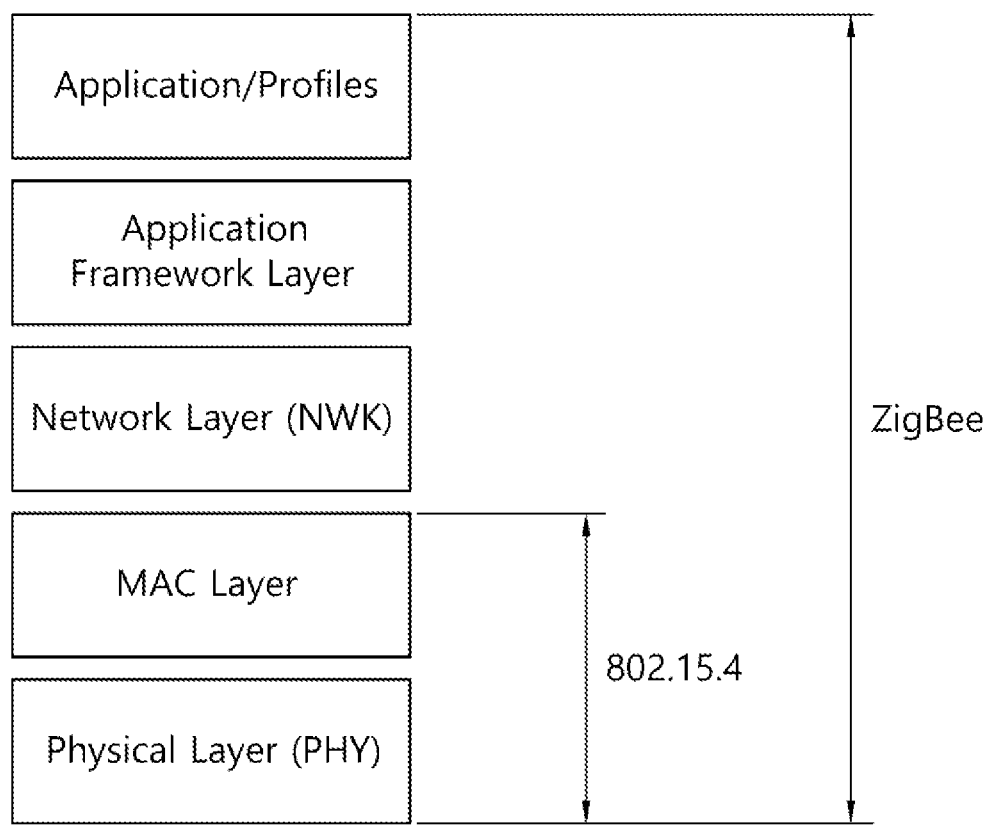
FIG. 5 shows a Zigbee stack.

FIG. 5 shows a Zigbee stack.

Zigbee is simpler than many other protocol stacks, and the Zigbee stack code size is small compared to other protocols. MAC and PHY are defined by the IEEE 802.15.4 standard. Network and application layers are defined by the Zigbee Alliance and the actual application provided by equipment designers.

802.15.4 is a simple packet data protocol for lightweight wireless networks. 802.15.4 was created to monitor and control applications where battery life is critical. 802.15.4 is at the root of ZigBee's excellent battery life.

802.15.4 can apply both IEEE long/short addressing. Short addressing is used for network management where network IDs are provisionally determined. This makes it less costly, but still enables use of around 65,000 network nodes.

In addition, 802.15.4 enables reliable data transmission and beacon management.

The network layer ensures proper operation of the MAC layer and provides an interface to the application layer. The network layer supports star, tree, and mesh topologies. The network layer is where networks are started, joined, destroyed, and retrieved.

The network layer is responsible for routing and security.

The application framework is an execution environment in which application objects can send and receive data. The application object is determined by the manufacturer of the Zigbee device. As defined by Zigbee, the application object is located at the top of the application layer and is determined by the device manufacturer. The application object actually builds the application; This could be a light bulb, light switch, LED, I/O line, etc.

Looking at home appliances released these days, the modifier 'smart' is almost mandatory. It is difficult to find products that are not 'smart', such as smart TVs, smart refrigerators, smart air conditioners, and smart washing machines. These smart products implement various convenience functions based on IoT (Internet Of Things) technology, which is equipped with wired and wireless networks, communicates closely with each other, and interlocks with each other. If you combine various sensors with IoT technology, such as temperature and humidity sensors, door sensors, motion sensors, and IP cameras, you can use more precise and diverse automation functions.

When a number of these smart products are gathered and applied to one house, a 'smart home' is born. If you live in such a home, you can use a variety of automated or remote functions, such as automatically turning on lights or air conditioners when you are ready to go home from outside work, and automatically playing appropriate music depending on the day's weather. Other similar concepts include 'smart building' and 'smart factory'.

However, there are side effects caused by the proliferation of smart products and the proliferation of products of various standards. It's just a compatibility issue. The core of IoT technology is communication and linkage between devices, and if each device uses a different IoT platform and does not link with each other, its usability is greatly reduced.

For example, if the speaker is a product based on the 'Apple HomePod' platform, but the TV is only compatible with the 'Samsung SmartThings' platform, you may not be able to use the function of turning on the TV or switching channels through voice commands. Of course, recently, one product supports two or more IoT platforms at the same time. Or, there is a way to decorate a smart environment by purchasing all products only based on the same platform. But even so, it is inconvenient to have to carefully check compatibility every time you buy a product.

But in the future you won't have to worry about that. This is because major IoT-related companies have gathered and announced standard specifications that enable all devices to be compatible without platform dependency. In May, the CSA (Connectivity Standards Alliance) standards association introduced an IoT standard protocol called 'Matter'. Formerly known as Project CHIP (Connected Home over IP), the Matter standard is being supported by Amazon, Google, Signify (Philips Hue), SmartThings, and other major players in the smart home market.

There are dozens of companies that have participated in or announced cooperation in establishing Matter standards, including Samsung Electronics, Google, Amazon, Apple, Tuya, Huawei, and Schneider Electric, all of which are global companies with a high share in the IoT market. If the Matter standard spreads widely, all smart devices will now work seamlessly without having to worry about manufacturers or platforms.

Matter is an IP-based protocol that can run over existing network technologies such as Wi-Fi, Ethernet, and Thread. The federation said Matter devices can be easily set up using Bluetooth Low Energy (BLE). It is explained that users do not have to do complicated configuration work because smart home devices can inform each other of their identity and possible operations.

In particular, Matter's 'multi-admin' feature allows products from various ecosystems, such as Apple HomeKit and Amazon Alexa, to work together without complicated work by end users. Multi-Manager also sets up layers of control to help different family members connect to smart appliances in the home with different levels of control.

Figure 6:
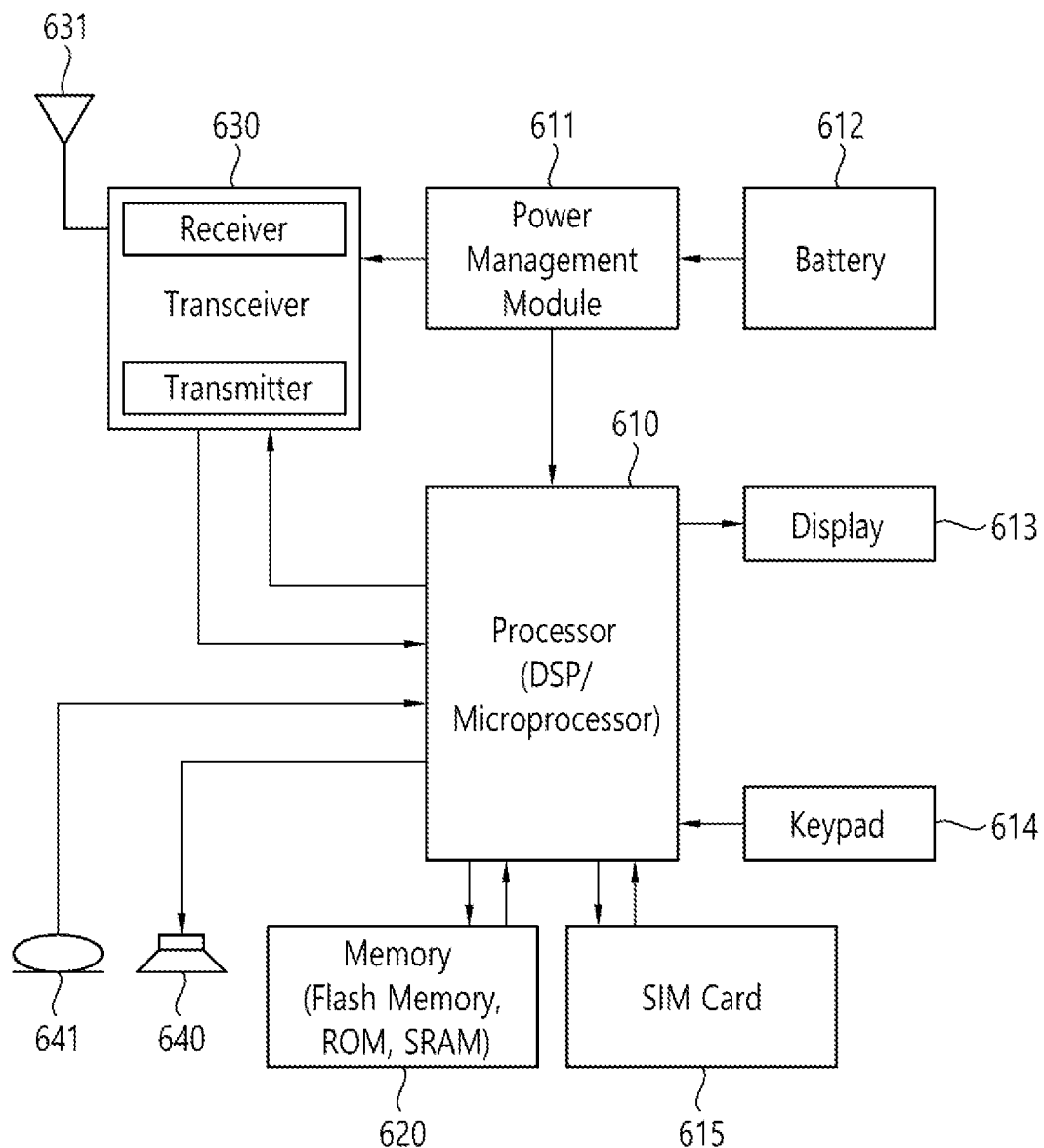
FIG. 6 shows a modified example of the transmitting device and/or the receiving device of the present specification.

FIG. 6 shows a modified example of the transmitting device and/or the receiving device of the present specification.

Each device/STA of the sub-figure (a)/(b) of FIG. 1 may be modified as shown in FIG. 6. A transceiver 630 of FIG. 6 may be identical to the transceivers 113 and 123 of FIG. 1. The transceiver 630 of FIG. 6 may include a receiver and a transmitter.

A processor 610 of FIG. 6 may be identical to the processors 111 and 121 of FIG. 1. Alternatively, the processor 610 of FIG. 6 may be identical to the processing chips 114 and 124 of FIG. 1.

A memory 620 of FIG. 6 may be identical to the memories 112 and 122 of FIG. 1. Alternatively, the memory 620 of FIG. 6 may be a separate external memory different from the memories 112 and 122 of FIG. 1.

Referring to FIG. 6, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 6, a speaker 640 may output a result related to a sound processed by the processor 610. A microphone 641 may receive an input related to a sound to be used by the processor 610.

2. Embodiments Applicable to this Specification

This specification describes a method for linking the operation of Connected Home over IP (CHIP) based on a Device-to-Device (D2D) connection structure with Cloud-to-Cloud (C2C) interworking technology. In particular, this specification explains that two CHIP Controllers connected to their respective clouds determine whether or not to link C2C-based accounts for multi-controller (Multi-Admin) operation, and if there is account linking, CHIP Multi-Admin is activated through account linking, and if there is no account linking, C2C account linking is started based on account information after CHIP Multi-Admin.

If the user's app supports D2D-based CHIP standard technology, D2C2D (Device-to-Cloud-to-Device) and C2C-based technology at the same time, this specification proposes a method for activating D2D multi-control of CHIP through D2C2D/C2C-based connection, especially interworking with C2C-based third-party cloud. In addition, the present specification proposes a method of inducing account linkage when a user manually connects D2D multiple controls and when there is no account linkage between clouds to which the corresponding controller is connected. In the case of linking accounts between D2D-based Multi-Admin and C2C, it is possible to confirm that the real user of Multi-Admin is the same person based on the account linking of both Clouds. This specification proposes a method to grant authority based on the same user when granting access control or authority through Multi-Admin.

2.1. Environment for Technology Application

Figure 7:
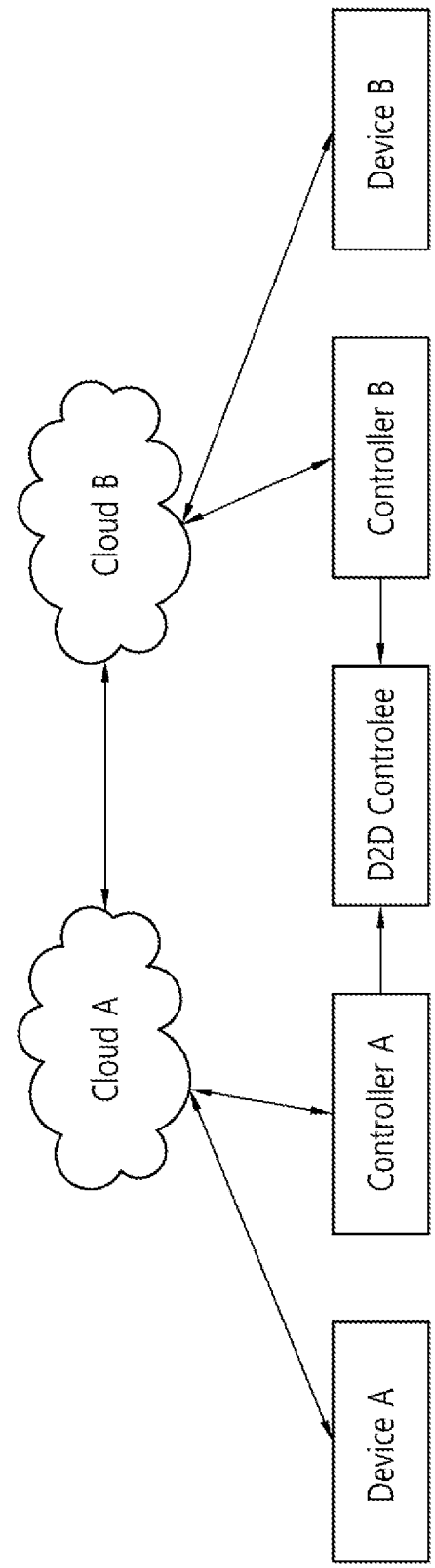
FIG. 7 shows a connection structure that simultaneously supports D2C2D and C2C.

FIG. 7 shows a connection structure that simultaneously supports D2C2D and C2C.

In the environment proposed in this specification, there are different controllers such as Controller A and Controller B as shown in FIG. 7. Device A and Device B are also connected to Cloud A and Cloud B, respectively, and Controller A can control Device A through Cloud A. At this time, the connection between clouds is the connection between Cloud A and Cloud B, and it is possible through the linkage between the account of Controller A and the account of Controller B connected to Cloud A.

The D2D Controlee between Controller A and Controller B is a device supporting only D2D, for example, a device supported by the CHIP standard. Controller A or Controller B can commission the D2D Controlee according to the CHIP standard. If one of the two controllers commissions first, the other device can be configured for D2D Controlee control according to the Multi-Admin standard technology.

2.2. Connected Home Over IP (CHIP) Multi-Admin Setup

Figure 8:
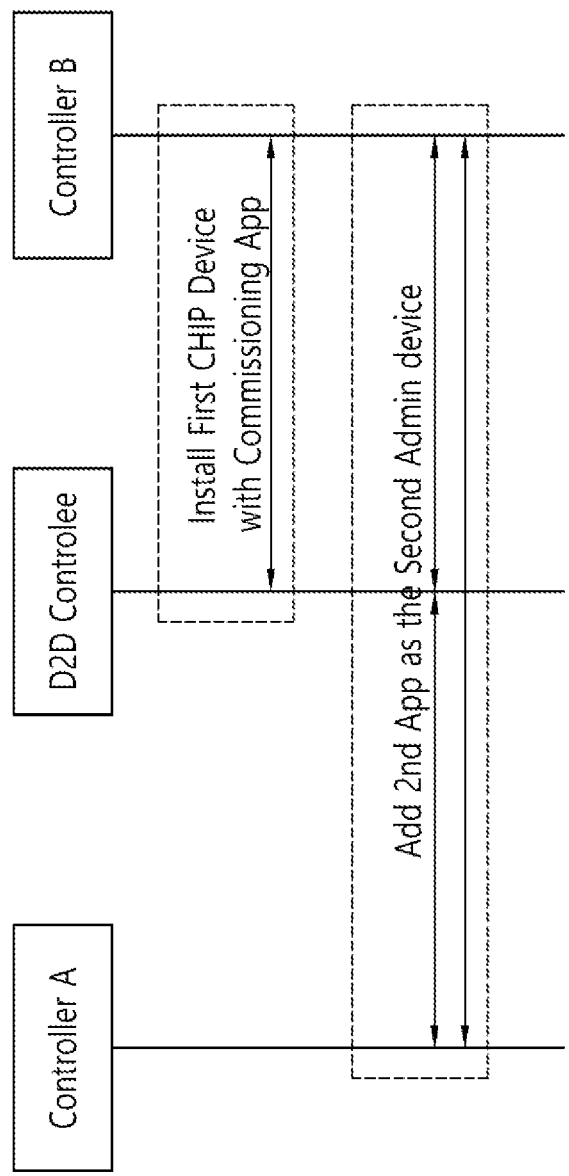
FIG. 8 shows an example of configuring multiple controllers according to Multi-Admin.

FIG. 8 shows an example of configuring multiple controllers according to Multi-Admin.

FIG. 8 is a Multi-Admin setting method according to the existing standard. In the embodiment of FIG. 8, Controller B first sets the control authority of the D2D Controlee, and Controller A is added as a new Admin/Controller to the fabric (CHIP Network) set by Controller B. Each commissioning protocol, 'Install First CHIP Device with Commissioning App' and 'Add 2nd App as the Second Admin device' follow the standard definition for detailed protocols and messages.

2.3. CHIP Multi-Admin Operation Based on C2C Interworking 2.3.1. CHIP Operation Based on C2C Account Linkage FIG. 9 shows a CHIP operation based on C2C account linkage.

Figure 9:
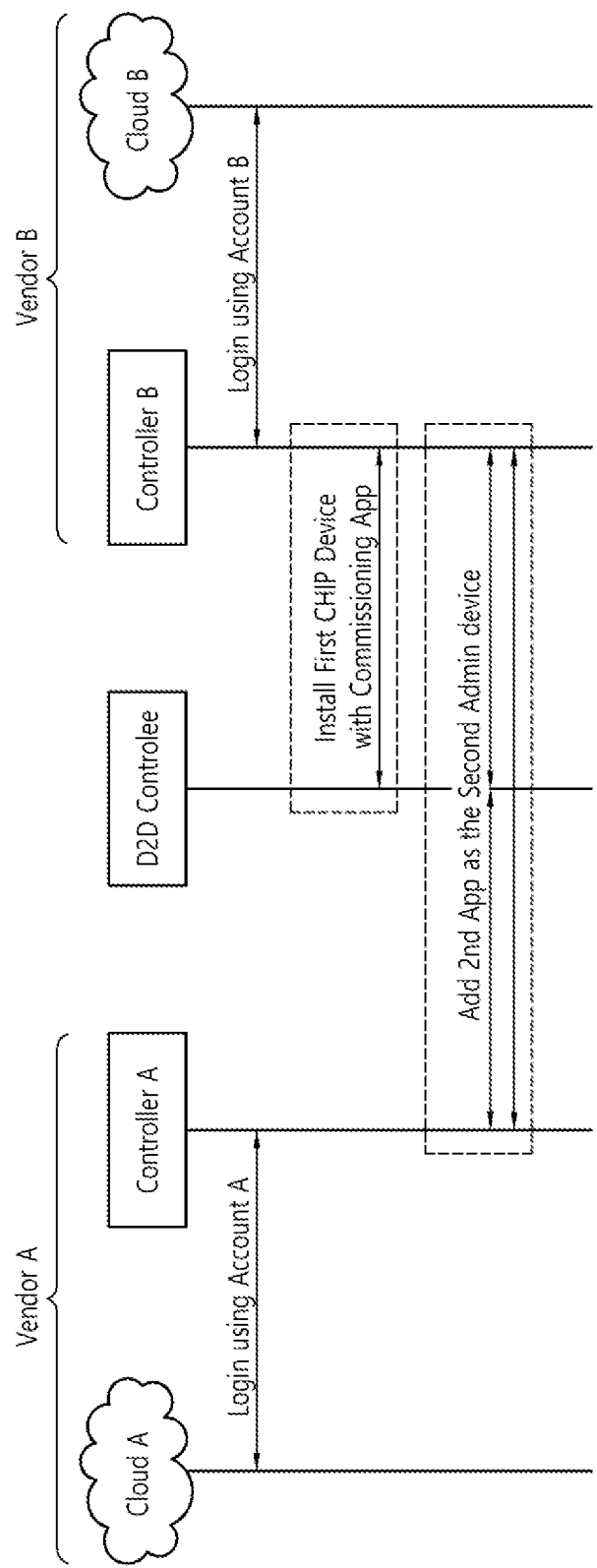
FIG. 9 shows a CHIP operation based on C2C account linkage.

FIG. 9 is a description of CHIP operation through inter-cloud account linkage. Controller A and Cloud A are connected through Account A before CHIP operation, and Controller B is connected to Cloud B using account B. At this time, Cloud A and Cloud B may be account linked through each account, or may not have account linking.

2.3.2. Operates when there is an Existing C2C Account Linkage

Figure 10:
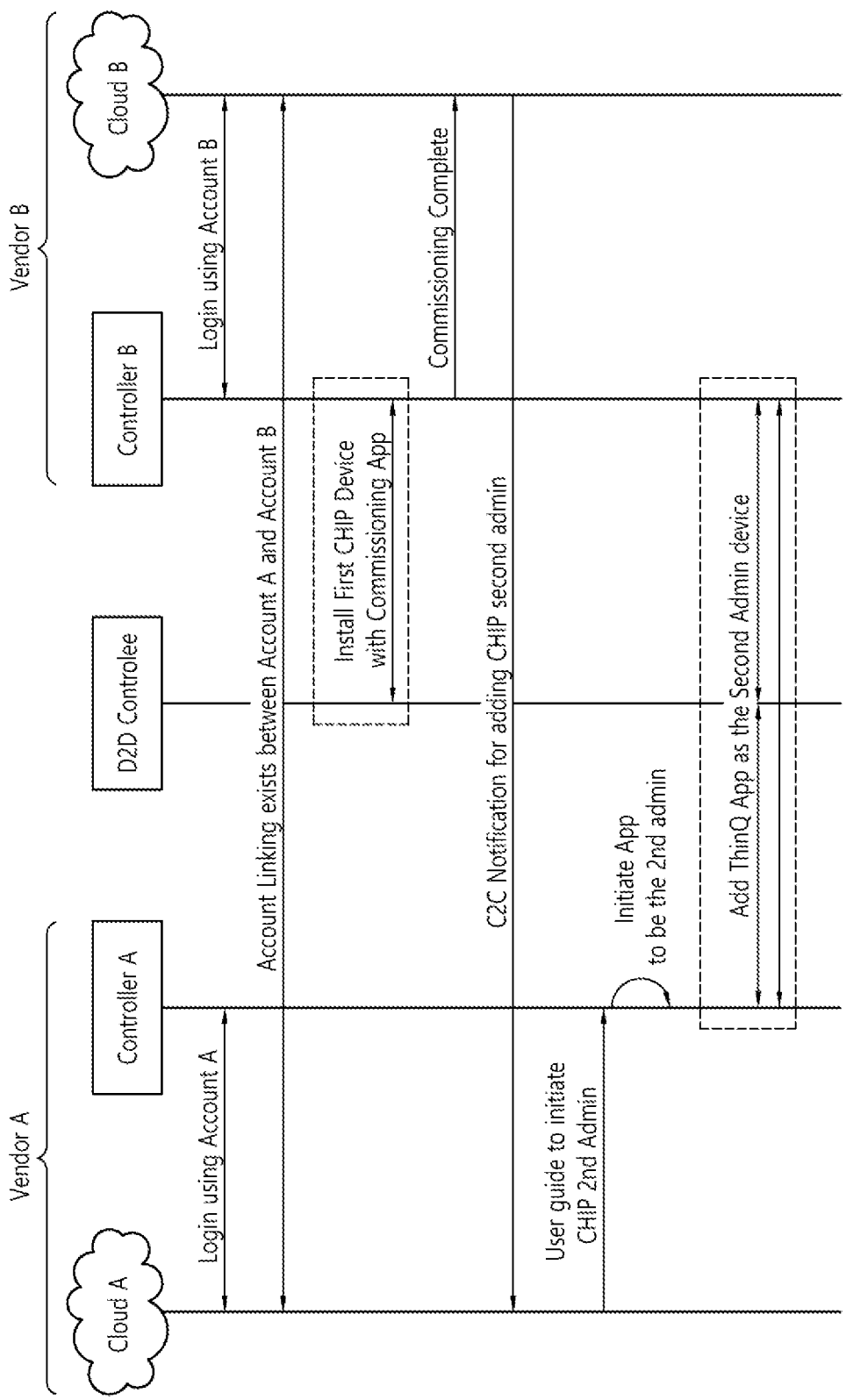
FIG. 10 shows operation steps for App-to-App connection.

FIG. 10 shows an operation when there is C2C Account Linking.

FIG. 10 is an example of a case where Account A of Vendor A and Account B of Vendor B have Account Linking prior to a CHIP operation.

Cloud B knows that its Account B is linked to Vendor A's account before CHIP connection. Cloud A also knows in advance that its own cloud account, Account A, is linked with Cloud B.

The user can commission a new CHIP device, the D2D Controlee, through Controller B according to the CHIP standard. When Commissioning is completed, Controller B informs its Cloud B of the information (Commissioning Complete). Upon receiving this, Cloud B notifies Cloud A, which is account-linked with itself, of commissioning completion through C2C Notification. At this time, the C2C Notification is information about the inclusion of a new CHIP Controlee, and may include information of the corresponding D2D Controlee. That is, D2D Controlee's manufacturer, model name, device type, supported functions, connected user accounts (Account A, Account B), firmware information, standard specification version, UUID (Universally Unique Identifier) of Controller B, IP address, Port number, MAC address etc. will be notified through C2C notification. Detailed information about this C2C Notification message will be described later. Cloud A, which receives this information through C2C connection, guides Controller A, a controller logged in as Account A, to be added as CHIP 2nd Admin. Here, the guide notifies, for example, that a new CHIP device is registered in the vicinity through the notification window of the App, and information such as the added device type, manufacturer/model name of the device, and actual user can be added as detailed information. Upon receiving this, Controller A starts the multi-admin setting process defined in the CHIP standard based on the information. At this time, based on the received information, Controller A can quickly search for and connect Controller B and D2D Controlee within the network.

2.3.3. Operates when there is No C2C Account Linkage

Figure 11:
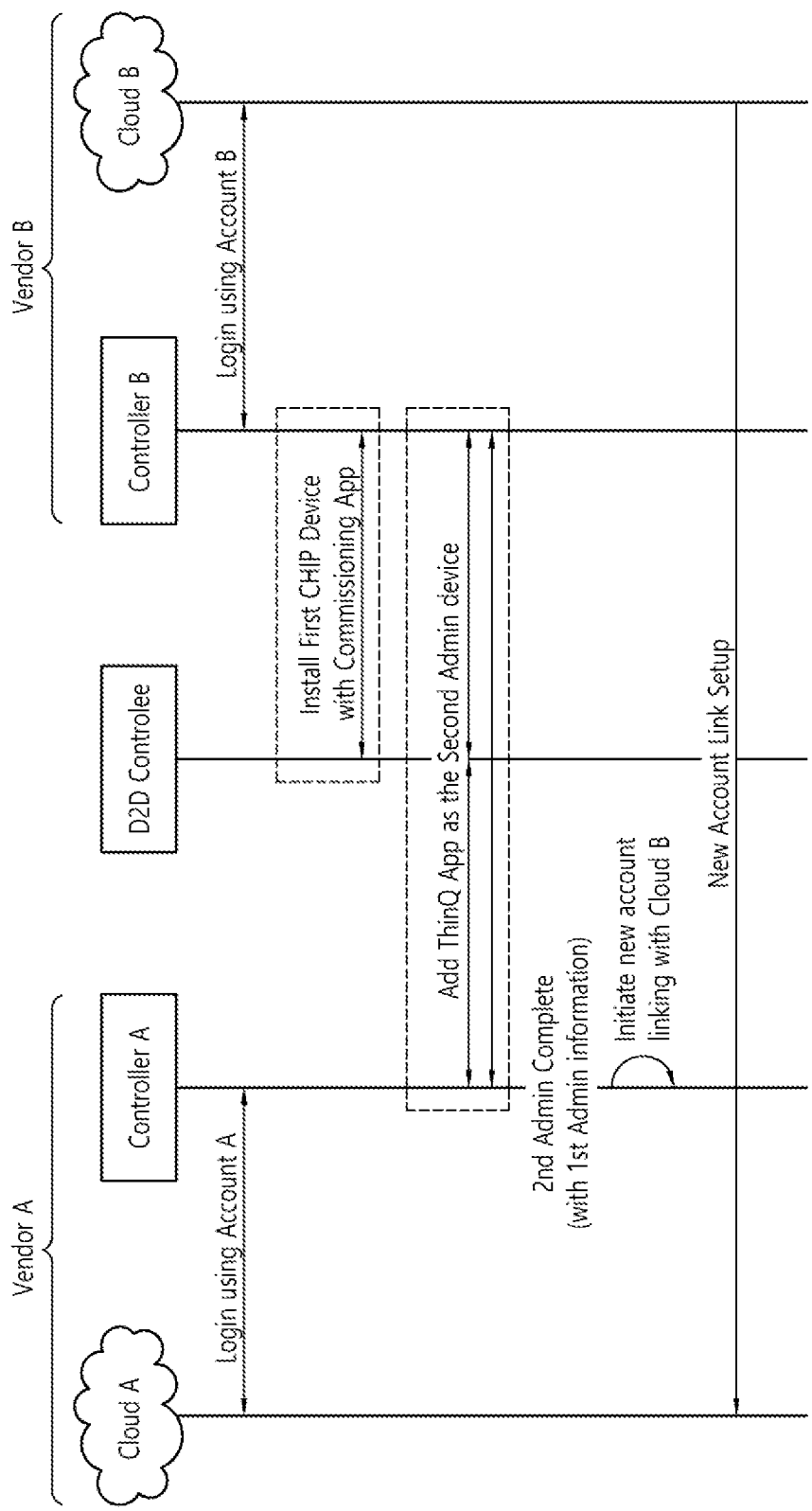
FIG. 11 shows an operation when there is no C2C Account Linking.

FIG. 11 shows an operation when there is no C2C Account Linking.

FIG. 11 is a description of a case where Account Linking is not set between Cloud A and Cloud B. Controller A and Controller B are logged in with accounts with their respective clouds, Cloud A and Cloud B, and Controller B commissioned the D2D Controlee first. Unlike 2.3.2 above, there is no Account Linking between Cloud A and Cloud B, and Controller B cannot notify Cloud A through C2C. In this case, Controller A sets Multi-admin to control D2D Controlee according to the standard. When Multi-Admin setup is completed, Controller A acquires information about Controller B (manufacturer, model), etc. Based on this information, Controller A determines that account linking with Vendor B to which Controller B belongs is necessary. Controller A is guided to the setting window for account linking with Vendor A through the user User Interface (UI), and account linking is newly performed according to the account linking process described in 2.3.4.

2.3.4. Account Linking Course

Figure 12:
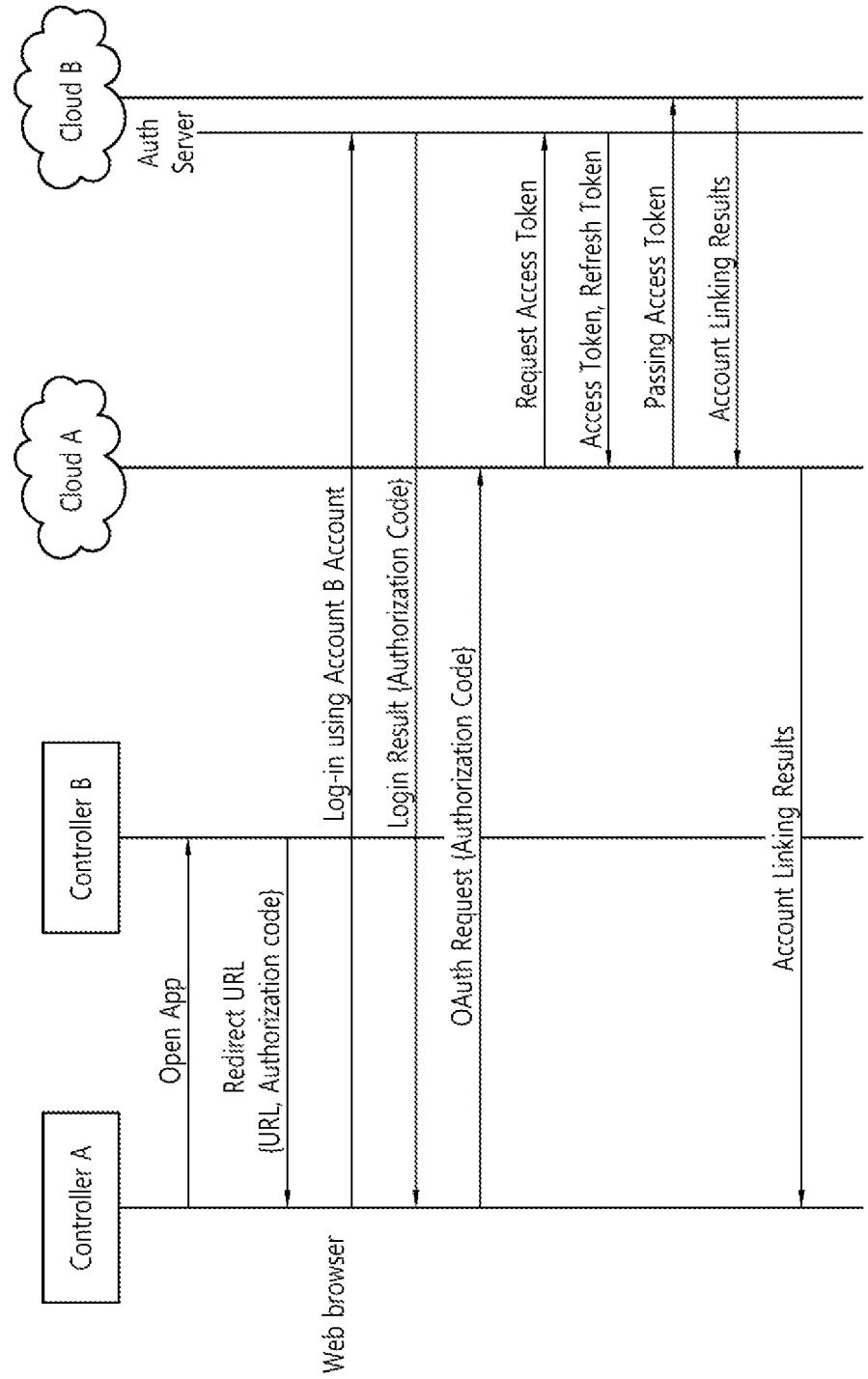
FIG. 12 shows an Account Linking process.

FIG. 12 shows an Account Linking process.

FIG. 12 shows a process of performing Account Linking between Cloud A and Cloud B. The basic Account Linking method follows the OAuth2.0 standard, and the detailed parameters and settings differ depending on each manufacturer.

Figure 13:
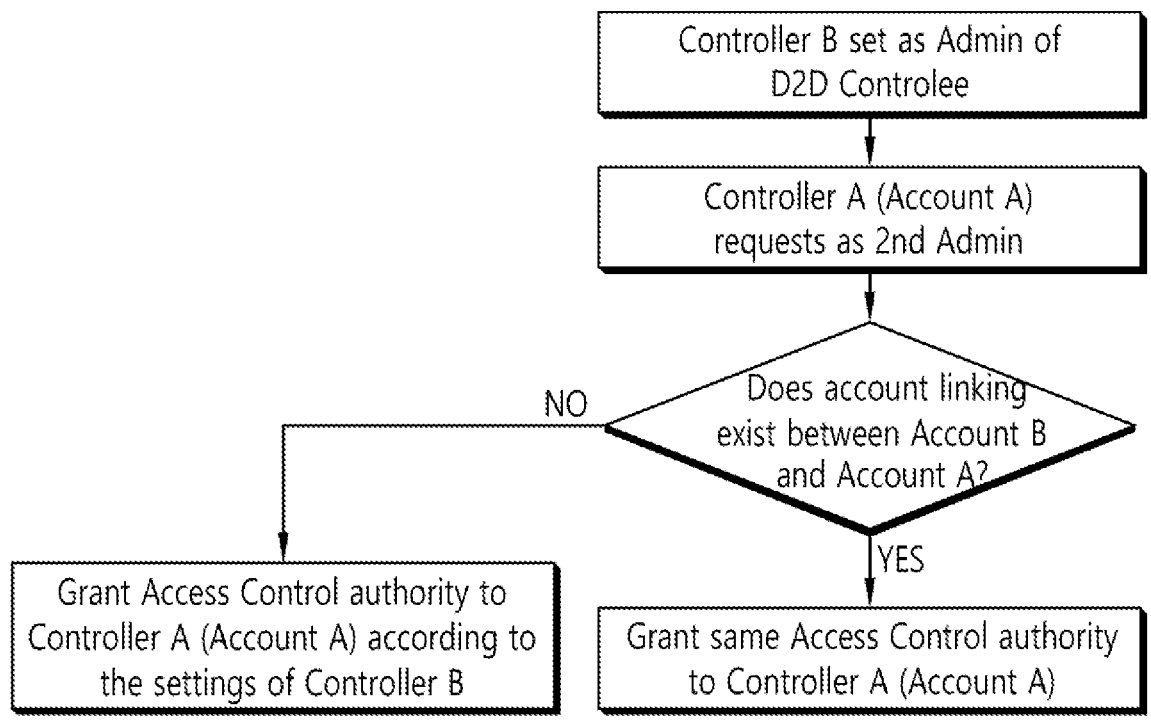
FIG. 13 shows a flowchart for setting access control authority according to Account Linking.

FIG. 13 shows a flowchart for setting access control authority according to Account Linking.

As the Account Linking is completed as shown in FIG. 12, it is possible to confirm that the user of Controller A and the user of Controller B are the same person. As shown in FIG. 13, the same authority can be granted to Controller A and Controller B when CHIP Access Control is applied based on this information.

2.4. Remote Access Behavior 2.4.1. Remote Access Operation Overview

Figure 14:
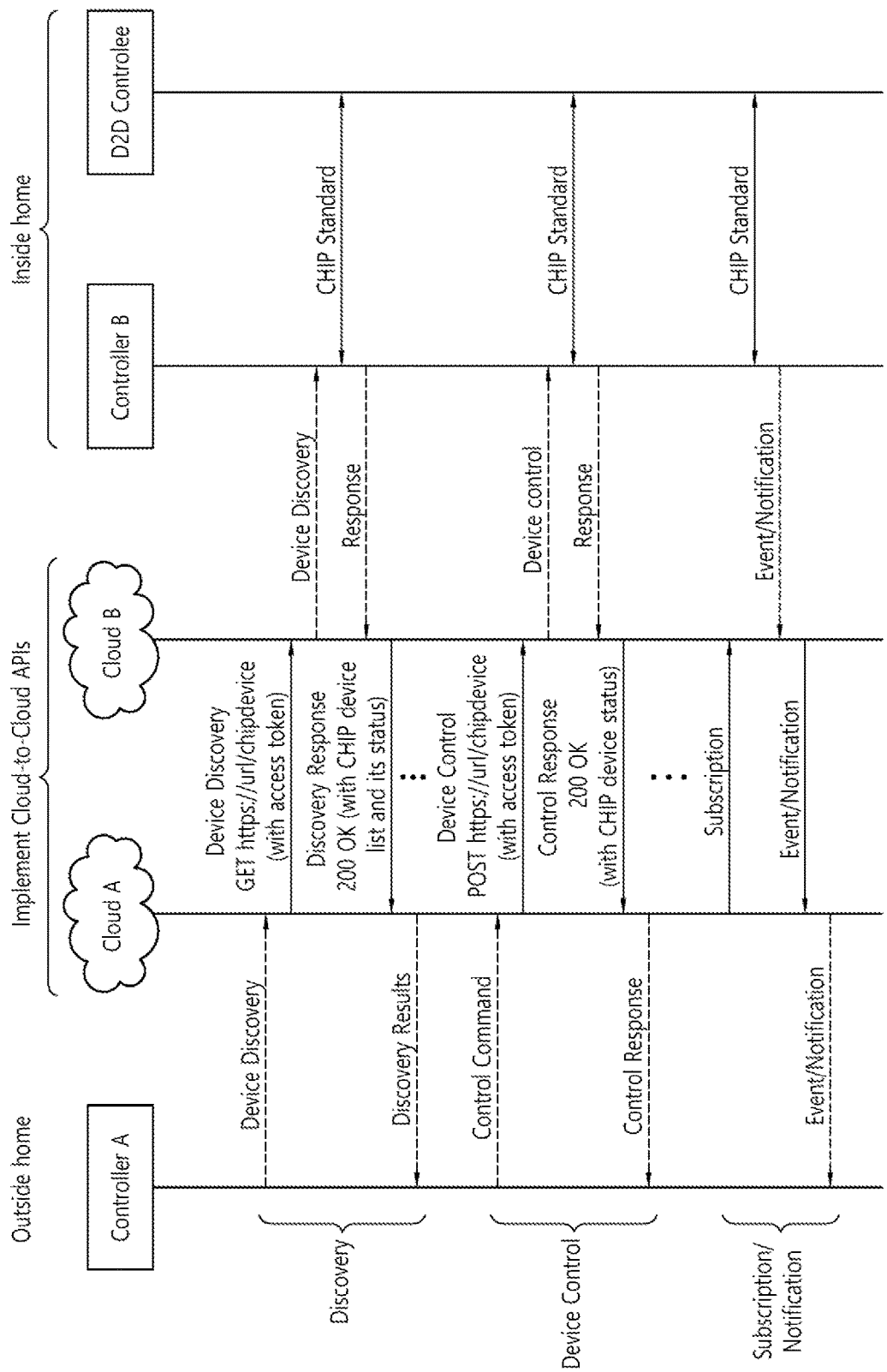
FIG. 14 shows a Remote Access procedure through a C2C interface.

FIG. 14 shows a Remote Access procedure through a C2C interface.

As shown in FIG. 14, it shows how Controller A accesses the D2D Controlee from a remote location through an interface between clouds. Although the embodiment of FIG. 14 has a structure in which C2C interworks through Cloud A and Cloud B, Cloud A and Cloud B may be implemented as one cloud depending on the implementation.

2.4.2. Device Search

Figure 15:
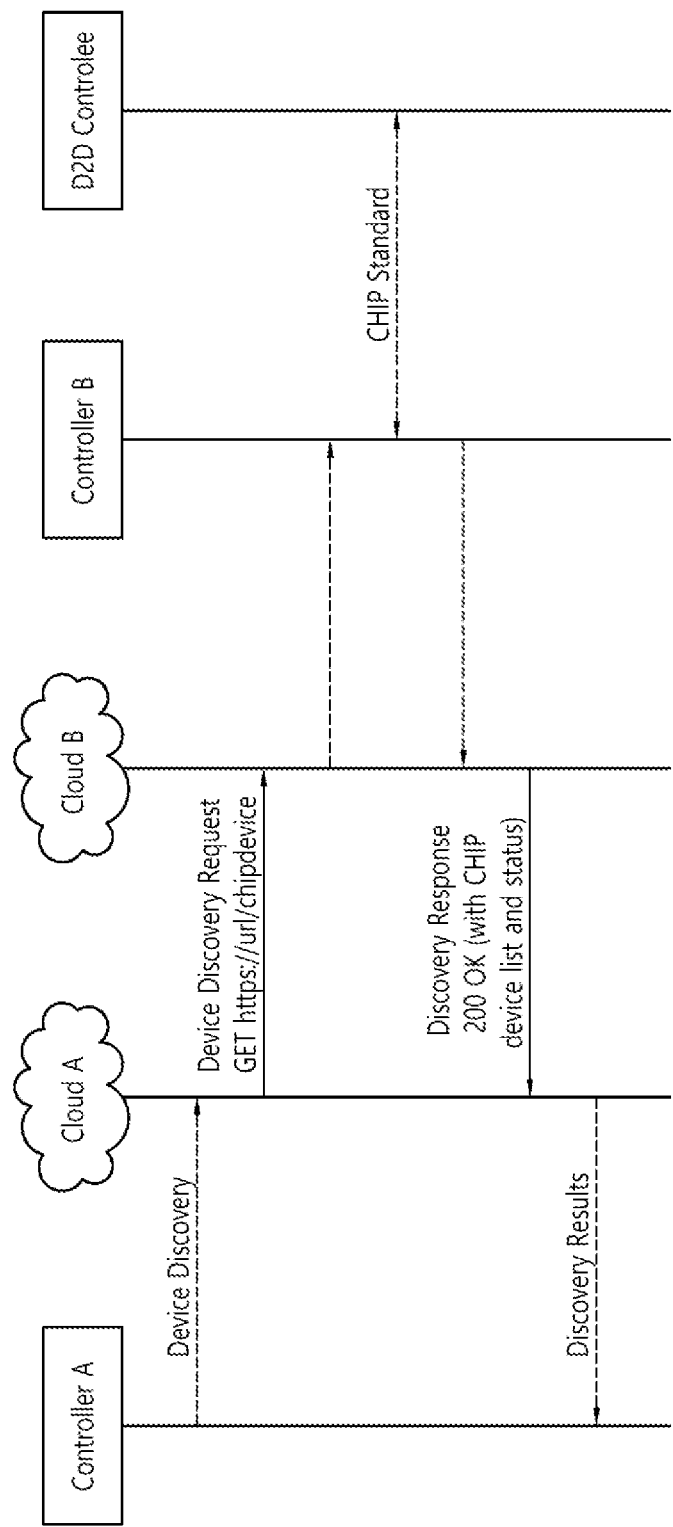
FIG. 15 shows a device search process in case of remote access.

FIG. 15 shows a device search process in case of remote access.

In order to search for a device through remote access, message exchange as shown in FIG. 15 is required.

FIG. 16 shows an example of a Device Discovery Request message.

FIG. 17 shows an example of a Device Discovery Response message.

Examples of messages used for search are shown in FIGS. 16 and 17. In the embodiment, the protocol for transmitting the message is HTTP, and the form of the payload of the message is JSON.

2.4.3. Device Control

Figure 18:
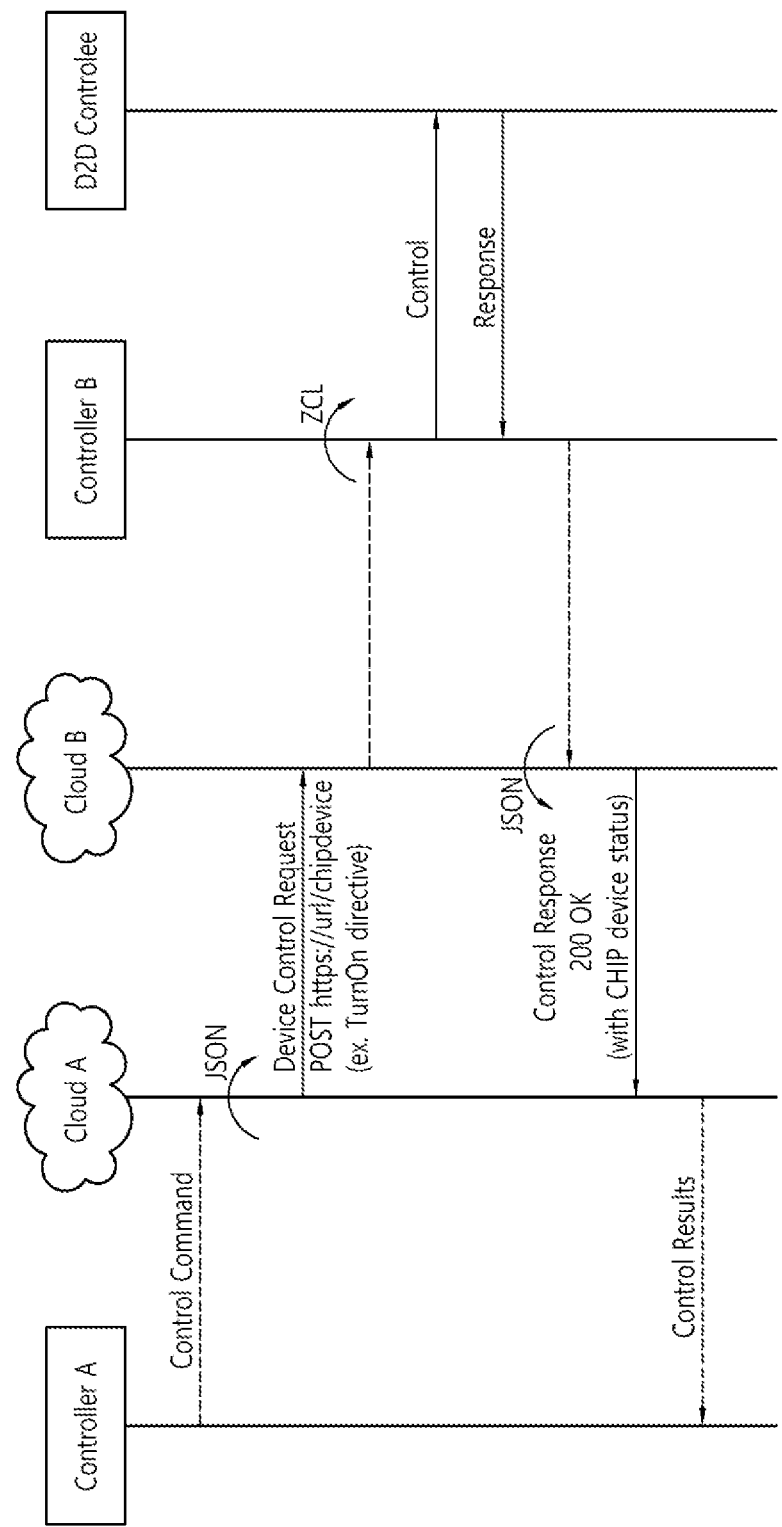
FIG. 18 shows an operation for device control.

FIG. 18 shows an operation for device control.

For device control through remote access, message exchange as shown in FIG. 18 is required.

Examples of messages used for device control are shown in FIGS. 19 and 20. In the embodiment, the protocol for transmitting the message is HTTP, and the form of the payload of the message is JSON.

FIG. 19 shows an example of a Device Control Request message.

FIG. 20 shows an example of a Device Control Response message.

2.4.4. Event/Notification Behavior

Figure 21:
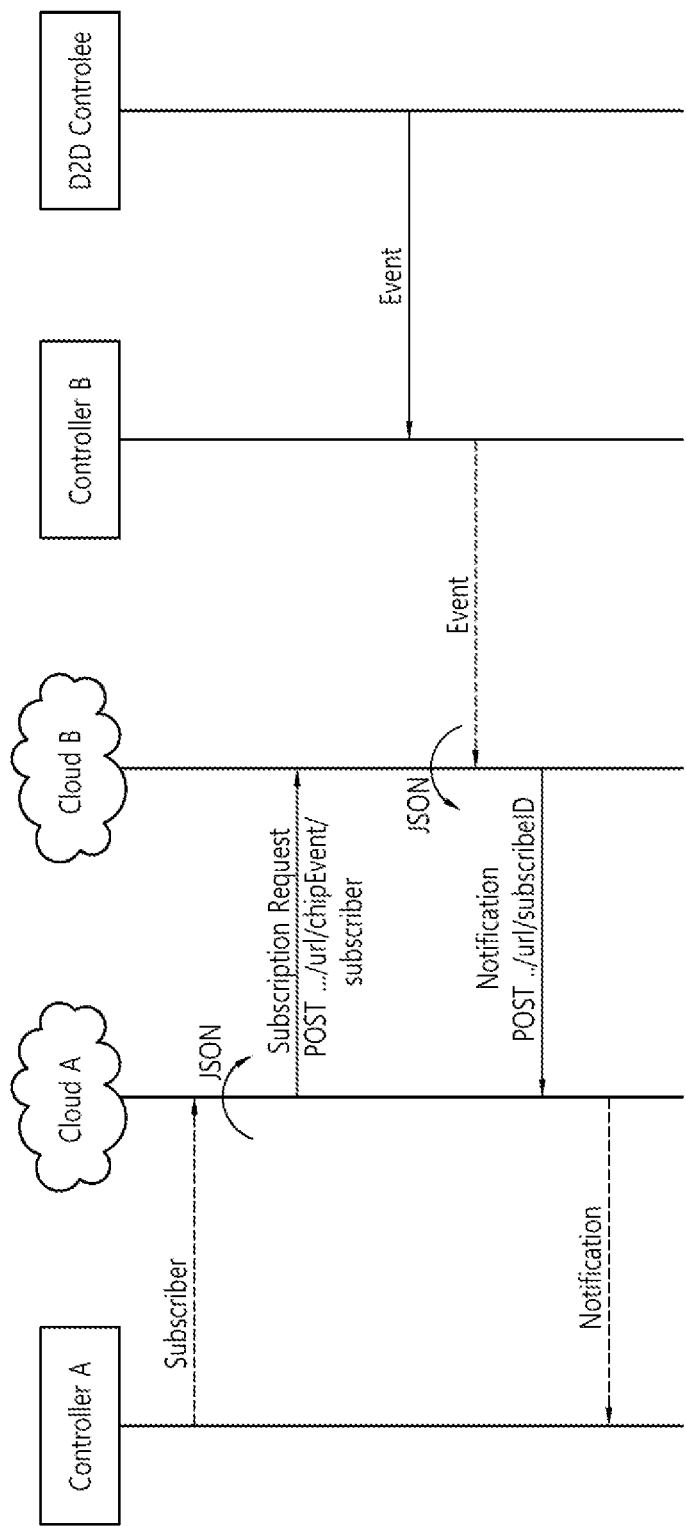
FIG. 21 shows the operation of Event/Notification processing.

FIG. 21 shows the operation of Event/Notification processing.

For event/notification processing, message exchange as shown in FIG. 21 is required.

Examples of messages used for events are shown in FIGS. 22 and 23. In the embodiment, the protocol for transmitting the message is HTTP, and the form of the payload of the message is JSON.

FIG. 22 shows an example of an Event Subscription Request message.

FIG. 23 shows an example of an Event/Notification message.

2.5. Remote Access to ThinQ App

Hereinafter, remote access to ThinQ App will be described.

This section describes how to remotely access a CHIP device through C2C. To do this, two CHIP controllers/apps establish the multi-manager protocol defined in the CHIP standard. Account linking between multiple clouds is established before and after setting up multi-administrators. Based on this account linking setup, we can ensure that both CHIP controllers/apps are associated with the same user. One CHIP controller outside the home can connect to a CHIP device in the home through another CHIP controller.

<Reasonable Assumptions>

A. The prerequisite is that the user completes Alexa cloud login using Echo and/or Alexa app by Amazon account and before the CHIP operation, the user completes LG cloud login using ThinQ app with LG account.

B. Account linking between Amazon and LG may or may not be initially established.

B-i. If you have an existing account link, you can use the C2C link to initiate a multi-admin setup. ->Refer to 'Multi-administrator settings for remote access through linking existing accounts' in FIGS. 24 to 26

B-ii. If there is no account linkage, the cloud sets account linkage after completing multi-administrator settings. ->See 'Multi-Admin settings for remote access without account linkage' in FIGS. 27 to 29

C. Clouds and apps know if there are existing accounts that are linked when a user logs into each cloud.

D. Call flow shows an example of remote access to the ThinQ app, but vice versa (e.g. remote access to the Alexa app) can be considered.

E. It is assumed that when the ThinQ app and Alexa app/Echo device complete the multi-admin setup procedure, access control or scope of the corresponding CHIP device is allowed through the C2C link.

Figure 24:
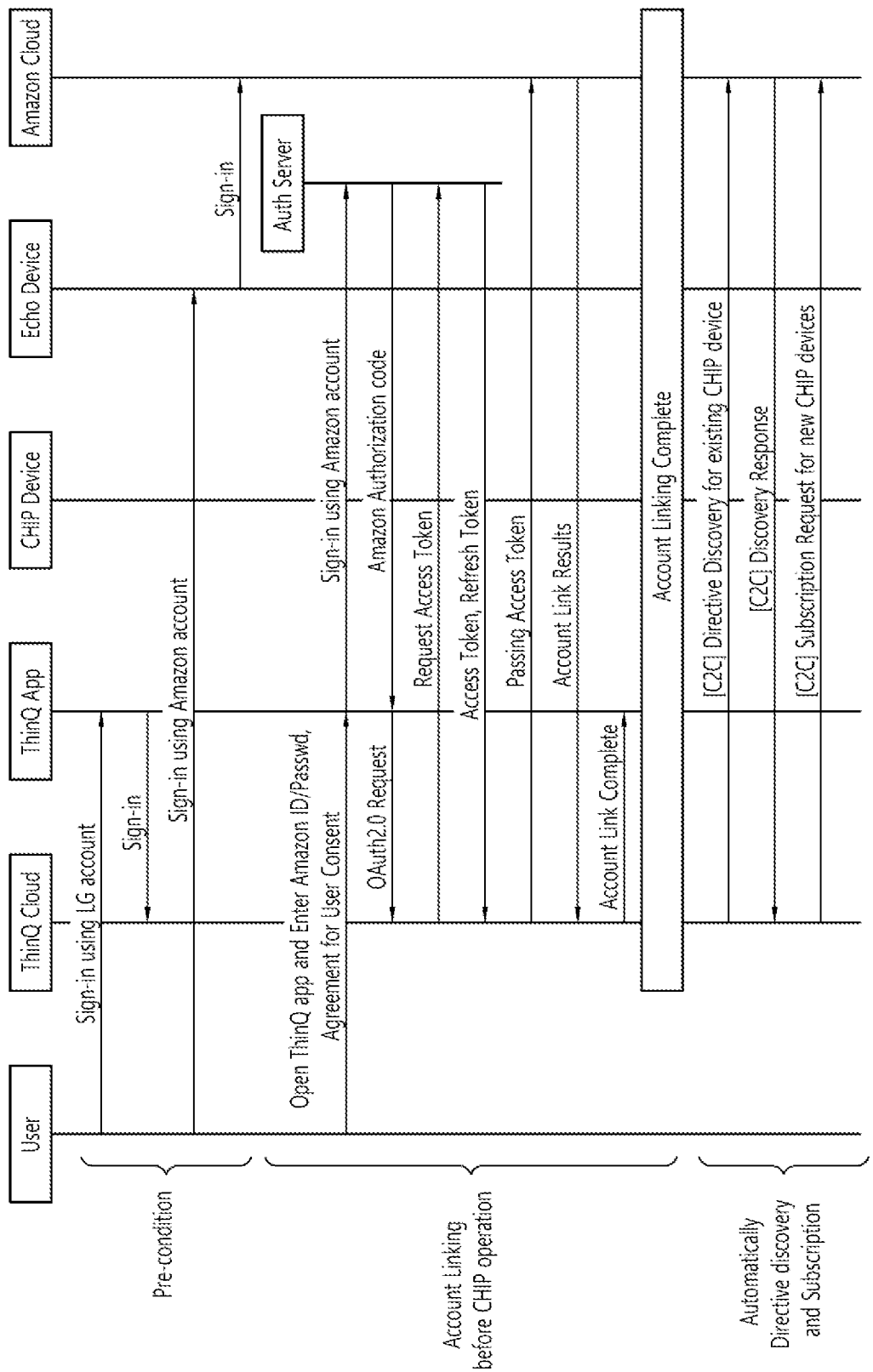
FIGS. 24 to 26 illustrate multi-administrator setting procedures for remote access when there is an existing account linkage.
Figure 25:
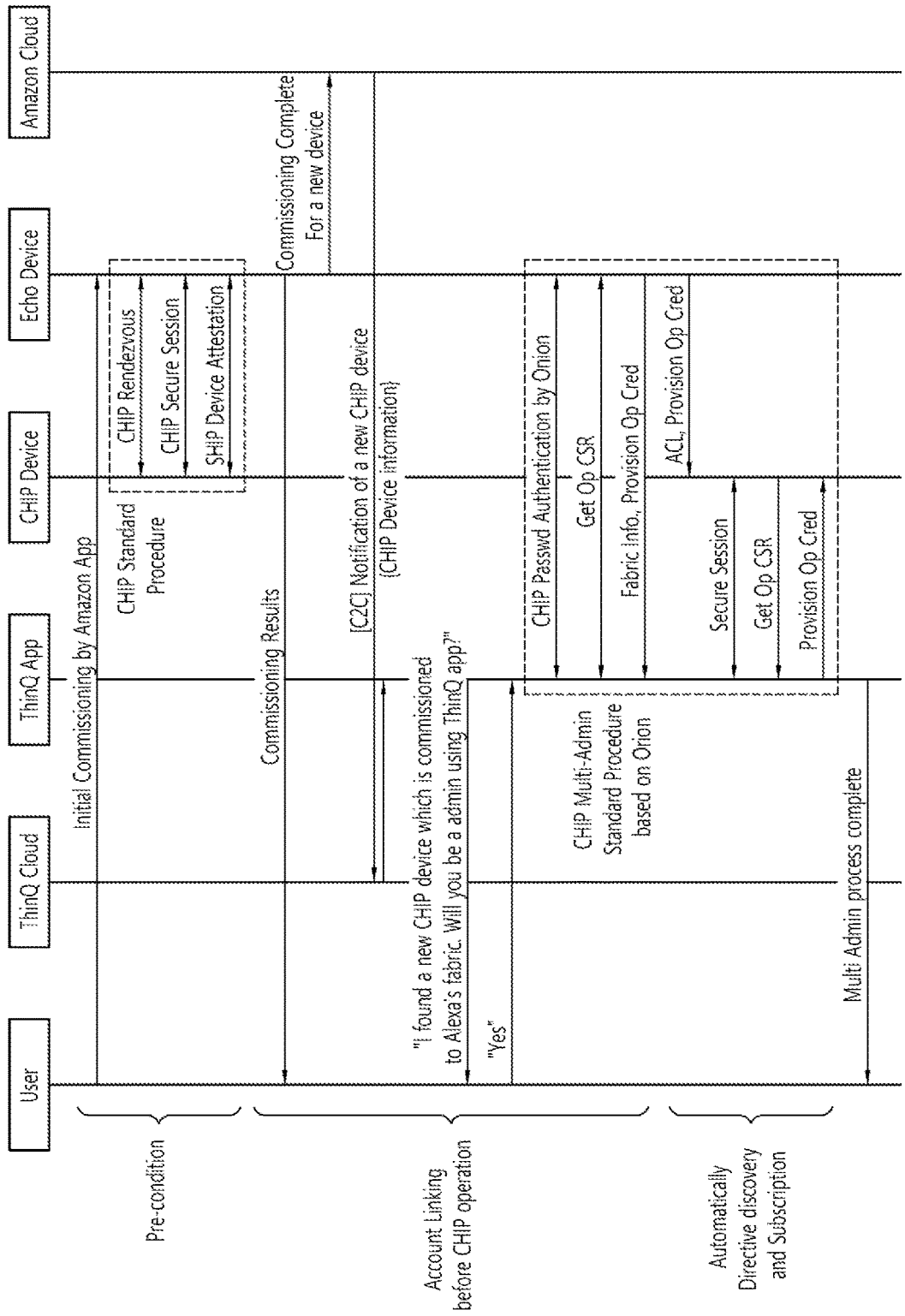
Figure 26:
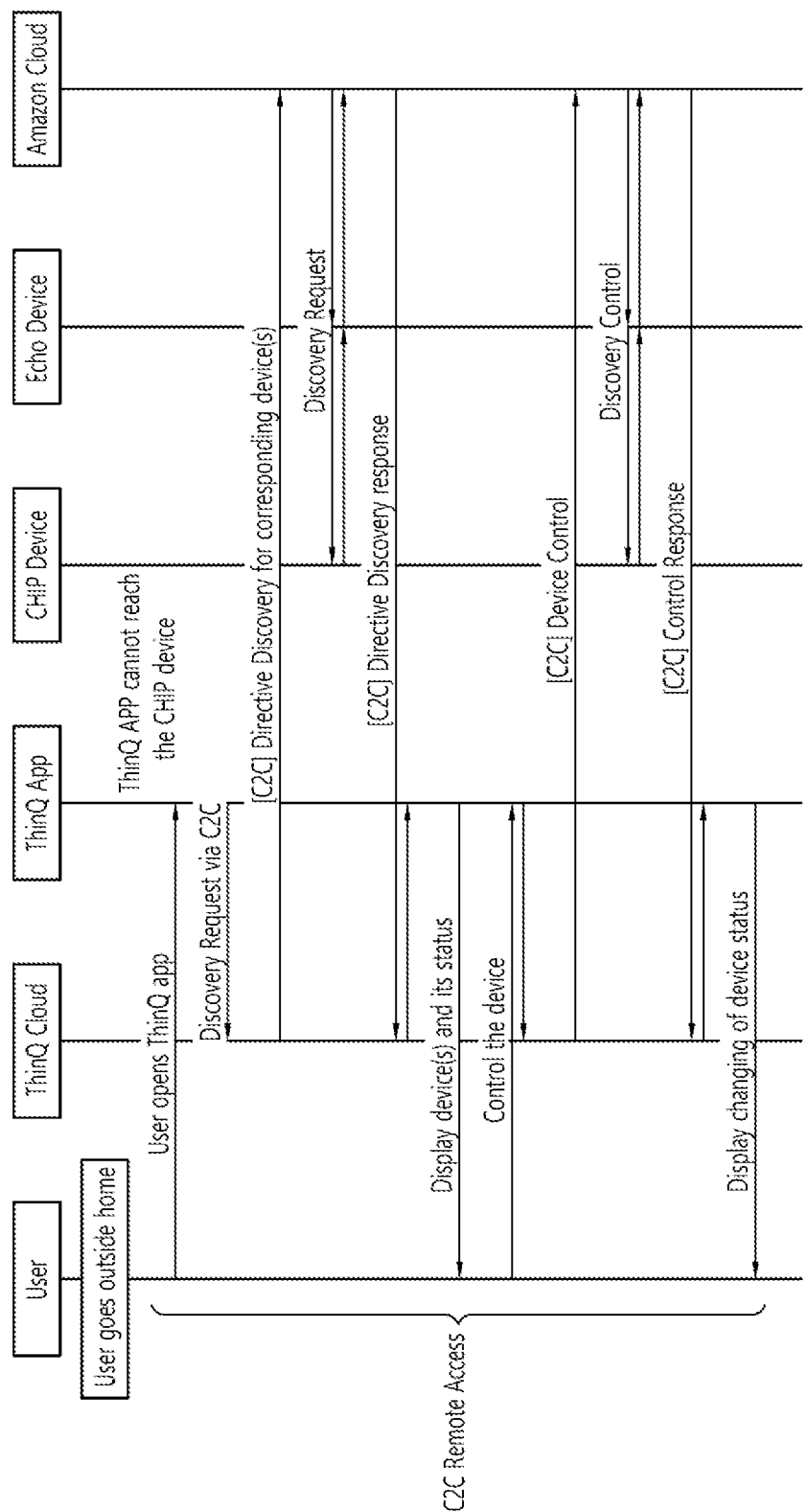

FIGS. 24 to 26 illustrate multi-administrator setting procedures for remote access when there is an existing account linkage.

Referring to FIG. 24, as a pre-condition, a user signs-in to the ThinQ App using an LG account, and the ThinQ App signs-in to the ThinQ cloud.

By account linking before CHIP operation, the user opens the ThinQ App, enters the Amazon ID and password, and obtains user consent. The ThinQ App uses the Amazon account to sign-in to the Auth server and receives the Amazon authentication code from the Auth server. ThinQ App sends OAuth2.0 Request message to ThinQ Cloud. The ThinQ cloud requests an access token from the Amazon cloud, and the Amazon cloud returns an access token to the ThinQ cloud or refreshes the token. The ThinQ cloud passes the access token to the Amazon cloud, and the Amazon cloud passes the result of account linking to the ThinQ cloud. When ThinQ Cloud notifies ThinQ App that account linking is complete, account linking between ThinQ cloud and Amazon cloud is completed.

Afterwards, through direct search and subscription, ThinQ Cloud delivers Directive Discovery messages for existing CHIP devices to Amazon Cloud, and Amazon Cloud delivers Discovery response messages to ThinQ Cloud. In addition, the ThinQ cloud can send a subscription request message for a new CHIP device to the Amazon cloud.

Referring to FIG. 25, for initial commissioning, the user performs initial commissioning by the Amazon App, the Echo device and the CHIP device perform the CHIP standard procedure, and the Echo device delivers the commissioning result to the user and informs the Amazon cloud that commissioning of the new device is complete.

Upon initiation of multi-administrator settings, the ThinQ cloud receives a notification message (CHIP device information) of a new CHIP device from the Amazon cloud. At this time, the ThinQ App has discovered a new CHIP device commissioned to Alexa's fabric (CHIP Network), and uses the ThinQ App to send a message to the user whether to become an administrator or not, and if the user replies Yes, multi-manager configuration process begins.

The multi-administrator setup procedure is performed based on the Orion-based CHIP multi-administrator standard procedure between ThinQ App, Echo devices, and CHIP devices. When the multi-administrator procedure is completed, the ThinQ App delivers a multi-administrator procedure completion message to the user.

FIG. 26 illustrates a procedure for performing C2C remote access when a user is away from home. Referring to FIG. 26, the user executes the ThinQ App, but the ThinQ App cannot reach the CHIP device. The ThinQ App delivers a Discovery Request message to the ThinQ Cloud through C2C, and the ThinQ Cloud delivers a Discovery Request message for the corresponding device(s) to the Amazon Cloud through C2C. Amazon Cloud searches for CHIP devices and sends a Discovery Response message for the search result to ThinQ Cloud through C2C. The ThinQ cloud displays the device and its status to the user and the ThinQ App, and the user can control the device through the ThinQ App. At this time, the ThinQ cloud sends a message about device control to the Amazon cloud through C2C, and the Amazon cloud searches for and finds the CHIP device, controls it, and sends a control response message including the result to the ThinQ cloud through C2C. ThinQ Cloud can display device status to users and ThinQ Apps.

Figure 27:
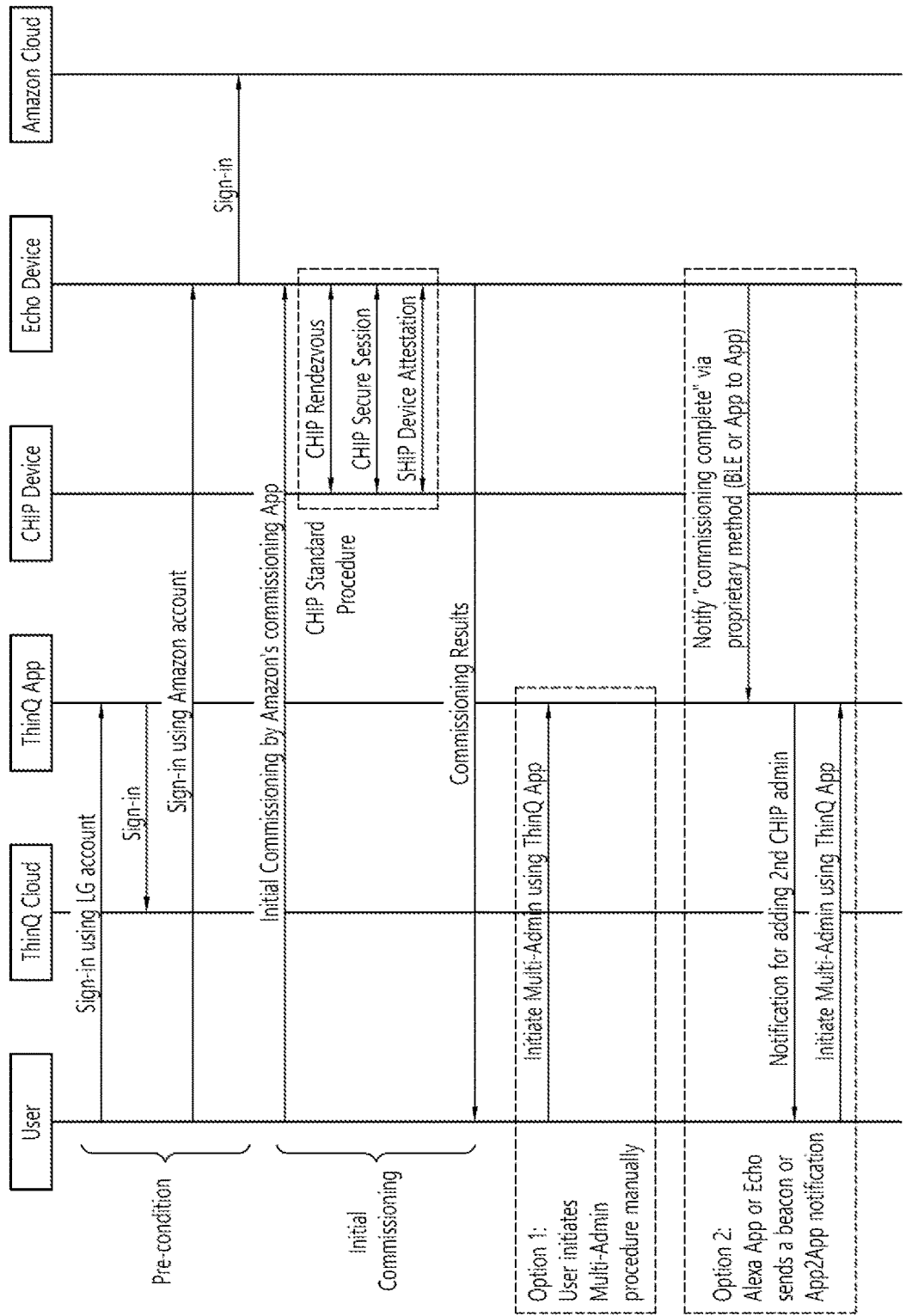
FIGS. 27 to 29 illustrate multi-administrator setting procedures for remote access when there is no existing account linkage.
Figure 28:
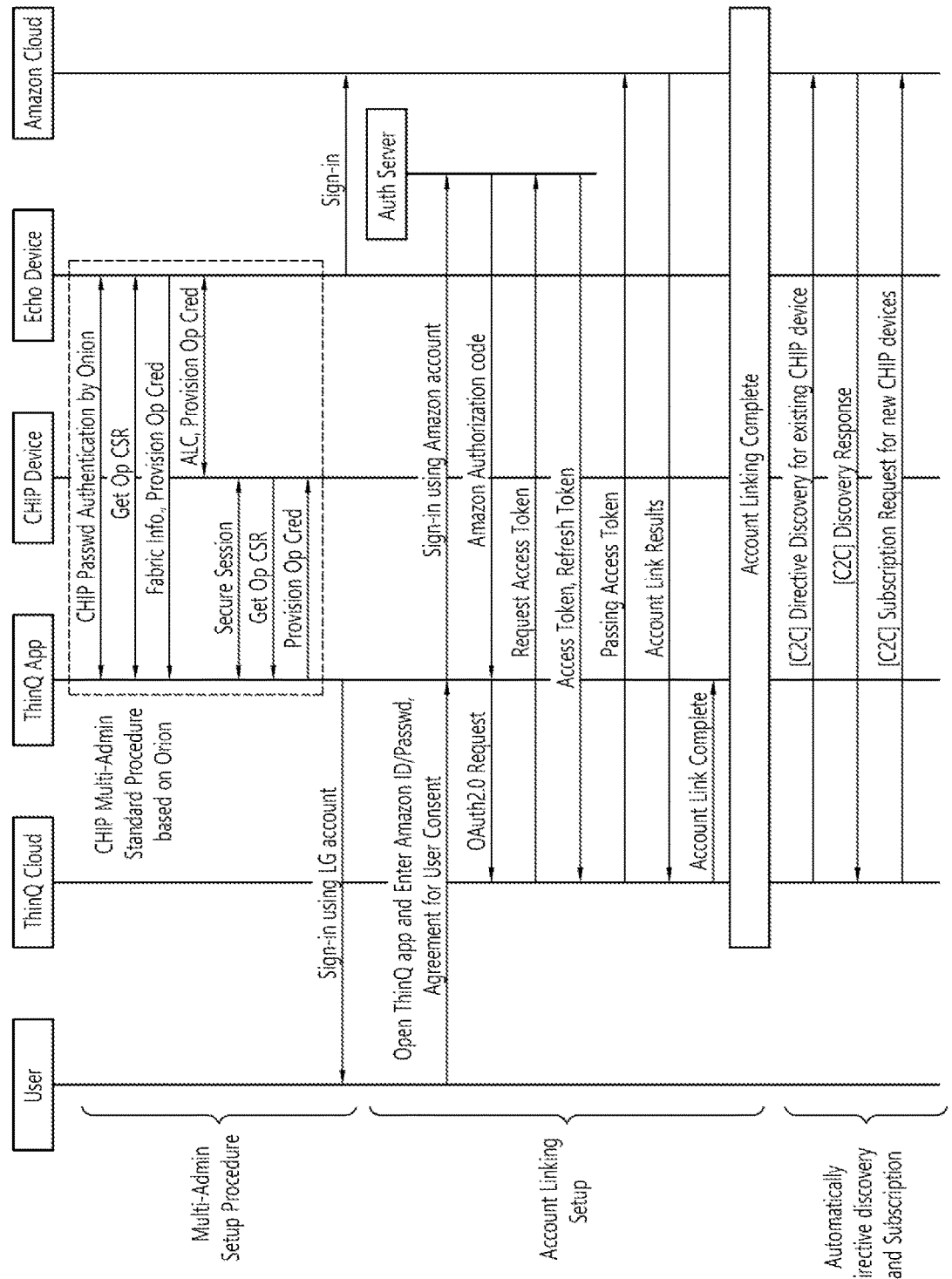
Figure 29:
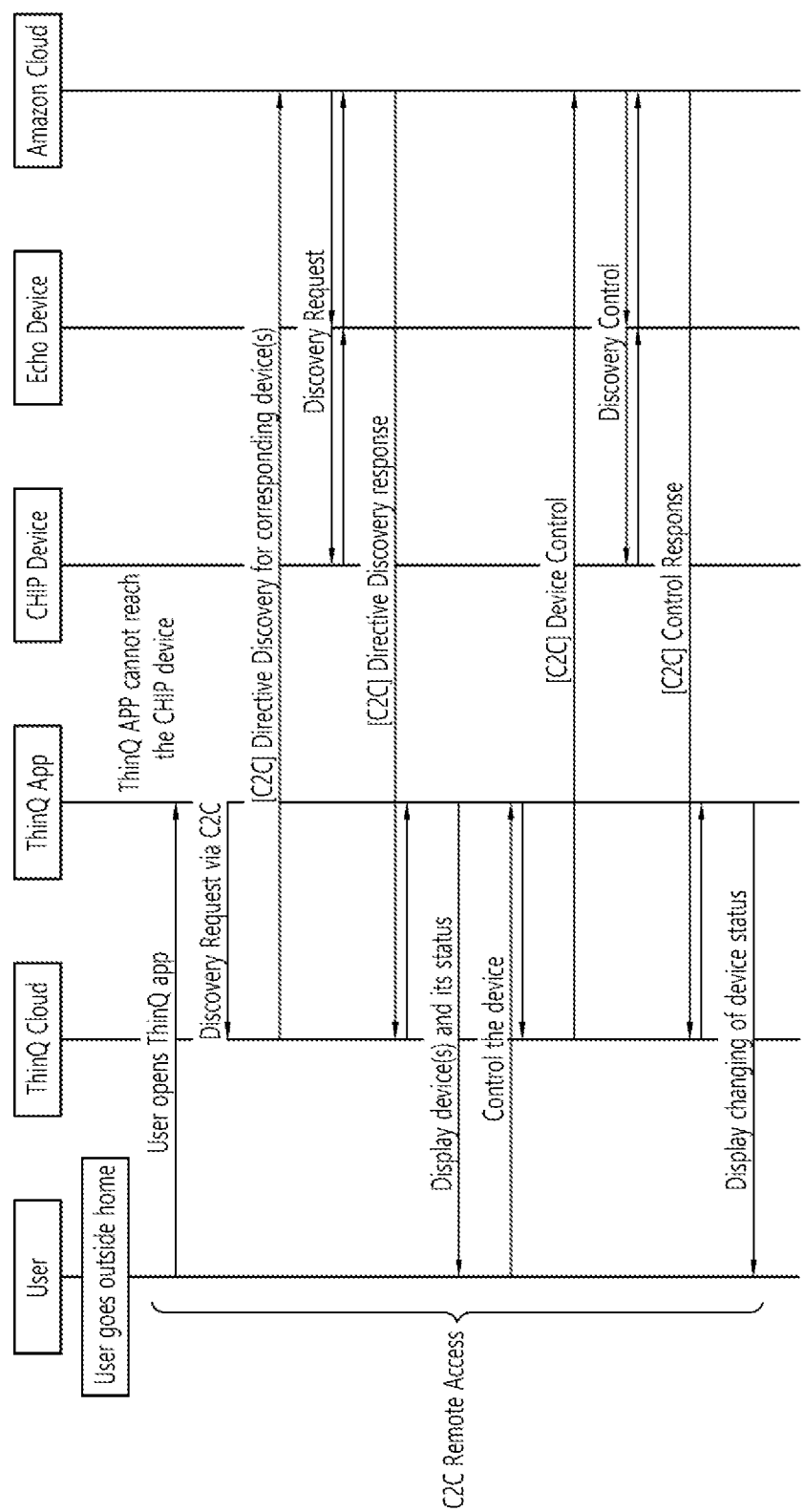

FIGS. 27 to 29 illustrate multi-administrator setting procedures for remote access when there is no existing account linkage.

Referring to FIG. 27, as a pre-condition, a user signs-in to the ThinQ App using an LG account, and the ThinQ App signs-in to the ThinQ cloud.

With initial commissioning, the user performs initial commissioning by Amazon App, Echo devices and CHIP devices perform CHIP standard procedures, and the Echo device delivers the commissioning result to the user and informs the Amazon cloud that commissioning of the new device is complete.

Option 1 allows the user to manually initiate multiple administrator procedures. That is, users can directly initiate multiple administrator procedures using the ThinQ App.

In addition, when receiving a beacon or App2App (App to App) notification message from an Alexa App or Echo device as Option 2, the user can initiate a multi-manager procedure. That is, the Echo device can notify the ThinQ App of the completion of commissioning through BLE or App2APP, and the ThinQ App can deliver a notification message that the second CHIP manager is added to the user. This allows users to initiate multiple admin procedures using the ThinQ App.

Referring to FIG. 28, the multi-administrator setting procedure is performed based on the Orion-based CHIP multi-administrator standard procedure between ThinQ App, Echo device, and CHIP device. When the multi-administrator procedure is completed, the ThinQ App delivers a multi-administrator procedure completion message to the user and guides the user to initiate account linking.

As an account linking setup procedure, the user opens the ThinQ App, enters the Amazon ID and password, and obtains user consent. The ThinQ App uses the Amazon account to sign-in to the Auth server and receives the Amazon authentication code from the Auth server. ThinQ App sends OAuth2.0 Request message to ThinQ Cloud. The ThinQ cloud requests an access token from the Amazon cloud, and the Amazon cloud returns an access token to the ThinQ cloud or refreshes the token. The ThinQ cloud passes the access token to the Amazon cloud, and the Amazon cloud passes the result of account linking to the ThinQ cloud. When ThinQ Cloud notifies ThinQ App that account linking is complete, account linking between ThinQ cloud and Amazon cloud is completed.

Afterwards, through direct search and subscription, ThinQ Cloud delivers Directive Discovery messages for existing CHIP devices to Amazon Cloud, and Amazon Cloud delivers Discovery response messages to ThinQ Cloud. In addition, the ThinQ cloud can send a subscription request message for a new CHIP device to the Amazon cloud.

FIG. 29 illustrates a procedure for performing C2C remote access when a user is away from home. Referring to FIG. 29, the user executes the ThinQ App, but the ThinQ App cannot reach the CHIP device. The ThinQ App delivers a Discovery Request message to the ThinQ Cloud through C2C, and the ThinQ Cloud delivers a Discovery Request message for the corresponding device(s) to the Amazon Cloud through C2C. Amazon Cloud searches for CHIP devices and sends a Discovery Response message for the search result to ThinQ Cloud through C2C. The ThinQ cloud displays the device and its status to the user and the ThinQ App, and the user can control the device through the ThinQ App. At this time, the ThinQ cloud sends a message about device control to the Amazon cloud through C2C, and the Amazon cloud searches for and finds the CHIP device, controls it, and sends a control response message including the result to the ThinQ cloud through C2C. ThinQ Cloud can display device status to users and ThinQ Apps.

Hereinafter, the above-described embodiment will be described with reference to FIGS. 1 to 29.

Figure 30:
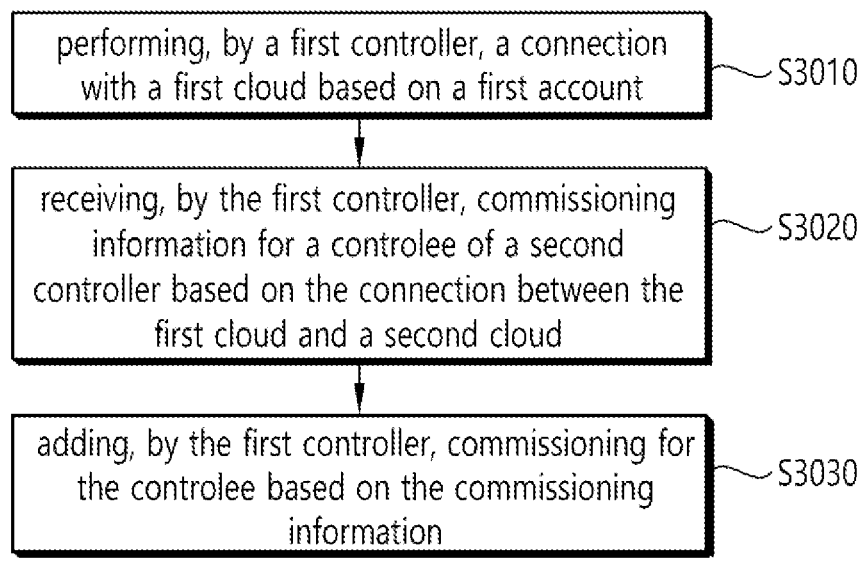
FIG. 30 is a flowchart illustrating a procedure for multi-controlling IoT devices based on C2C account linkage according to the present embodiment.

FIG. 30 is a flowchart illustrating a procedure for multi-controlling IoT devices based on C2C account linkage according to the present embodiment.

This embodiment proposes a method for controlling IoT devices by a plurality of IoT controllers through C2C (Cloud-to-Cloud) account linkage in a smart home environment. The first and second controller described below may correspond to the IoT controller device, and the controlee may correspond to the IoT device. In particular, the controlee is a device that supports only D2D (Device-to-Device), and the first or second controller may commission the controlee based on a D2D connection according to the CHIP standard. This embodiment proposes a method in which the second controller is first registered with the controlee, and the first controller is additionally registered with the controlee according to the CHIP standard through C2C account linkage.

In step S3010, a first controller connects to a first cloud based on a first account.

In step S3020, the first controller receives commissioning information for a controlee of a second controller based on a connection between the first cloud and a second cloud.

In step S3030, the first controller adds commissioning for the controlee based on the commissioning information.

The second controller is connected to the second cloud based on a second account. In addition, the second controller first commissions the controlee based on a CHIP standard and has a right to control the controlee first. The commissioning information for the controlee of the second controller is information required to add the first controller as a new administrator (admin/controller) of the controlee. The first controller may secondly have the right to control the controlee by adding commissioning for the controlee based on the commissioning information.

Specifically, the first controller may receive a permission message for access control of the controlee from the second controller. The first controller may control the controlee by executing an application based on the permission message. The first controller may be set as a second manager of the controlee, and the second controller may be set as a first manager of the controlee.

The permission message may include information that the first controller receives the same authority for access control as the second controller or information that the first controller receives authority for access control set by the second controller. For example, the second controller may differentially grant authority for access control to the first controller with information such as AC (Access Category).

A description of the connection between the first and second clouds is as follows. The first and second accounts are linked with each other. That is, since the first and second accounts are linked, even if the first and second clouds are clouds built by different vendors (for example, the first cloud may be built by a first manufacturer, the second cloud may be built by a second manufacturer), the first and second clouds may be connected to each other through account linkage. As the first and second accounts are linked, it may be confirmed that a user of the first controller and a user of the second controller are the same person. The first and second accounts may be linked based on issuance of an access token and a refresh token.

That is, this embodiment proposes a multi-manager setting method in which a plurality of controller control controlees through C2C account linkage, and there is an effect that a specific controller can quickly search for and connect other controllers and controlees within one network to implement various convenience functions for IoT devices.

The commissioning information may include a manufacturer of the controlee, model name, device type, supported function, connected user account, firmware information, standard specification version, Universally Unique Identifier (UUID) of the second controller, IP (Internet Protocol) address, the port number and MAC address.

For example, when the first controller is located outside a home and the controlee is located inside the home, a method for controlling the controlee by the first controller is as follows.

The first controller transmits a device search request message to the controlee. The first controller receives a device search response message from the controlee. The first controller transmits a device control request message to the controlee. The first controller receives a device control response message from the controlee. The first controller transmits a subscription request message to the controlee. The first controller receives a notification message for a subscription request from the controlee.

The device search request message, the device search response message, the device control request message, the device control response message, the subscription request message, and the notification message are transmitted and received based on the connection between the first and second clouds. That is, the first controller can access and control the controlee externally (or remotely) through a C2C connection (interface between clouds). In this case, the first and second clouds may be implemented as one cloud.

The notification message may include information that an event has occurred in the controlee. A protocol for transmitting the device control request message, the device control response message, the subscription request message, and the notification message may set to HyperText Transfer Protocol (HTTP). Payloads of the device control request message, the device control response message, the subscription request message, and the notification message may be set in JavaScript Object Notation (JSON) format.

3. Device Configuration

The technical features of the present disclosure may be applied to various devices and methods. For example, the technical features of the present disclosure may be performed/supported through the device(s) of FIG. 1 and/or FIG. 6. For example, the technical features of the present disclosure may be applied to only part of FIG. 1 and/or FIG. 6. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 6. For example, the device of the present specification is a device operating in a wireless LAN system in a smart home environment, and the device includes a memory and a processor operably coupled to the memory, wherein the processor is configured to perform a connection with a first cloud based on a first account; receive commissioning information for a controlee of a second controller based on the connection between the first cloud and a second cloud; and add commissioning for the controlee based on the commissioning information.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including performing a connection with a first cloud based on a first account; receiving commissioning information for a controlee of a second controller based on the connection between the first cloud and a second cloud; and adding commissioning for the controlee based on the commissioning information. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 6. Meanwhile, the CRM of the present disclosure may be the memory 112, 122 of FIG. 1, the memory 620 of FIG. 6, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method.

In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system of a smart home environment, the method comprising:
   performing, by a first controller, a connection with a first cloud based on a first account;
   receiving, by the first controller, commissioning information for a controlee of a second controller based on the connection between the first cloud and a second cloud; and
   adding, by the first controller, commissioning for the controlee based on the commissioning information,
   wherein the second controller is connected to the second cloud based on a second account, and
   wherein the first and second accounts are linked to each other, and
   wherein the commissioning information includes a manufacturer of the controlee, a model name, a device type, a supported function, a connected user account, firmware information, a standard specification version, a Universally Unique Identifier (UUID) of the second controller, an IP (Internet Protocol) address, a port number and a MAC address.

2. The method of claim 1, further comprising:
   receiving, by the first controller, a permission message for access control of the controlee from the second controller; and
   controlling, by the first controller, the controlee by executing an application based on the permission message
   wherein the first controller is set as a second manager of the controlee,
   wherein the second controller is set as a first manager of the controlee.

3. The method of claim 2, wherein the permission message includes information that the first controller receives the same authority for access control as the second controller or information that the first controller receives authority for access control set by the second controller.

4. The method of claim 1, wherein when the first controller is located outside a home and the controlee is located inside the home,
   further comprising:
   transmitting, by the first controller, a device search request message to the controlee;
   receiving, by the first controller, a device search response message from the controlee;
   transmitting, by the first controller, a device control request message to the controlee;
   receiving, by the first controller, a device control response message from the controlee;
   transmitting, by the first controller, a subscription request message to the controlee; and
   receiving, by the first controller, a notification message for a subscription request from the controlee,
   wherein the device search request message, the device search response message, the device control request message, the device control response message, the subscription request message, and the notification message are transmitted and received based on the connection between the first and second clouds,
   wherein the notification message includes information that an event has occurred in the controlee.

5. The method of claim 4, wherein a protocol for transmitting the device control request message, the device control response message, the subscription request message, and the notification message is set to HyperText Transfer Protocol (HTTP),
   wherein Payloads of the device control request message, the device control response message, the subscription request message, and the notification message are set in JavaScript Object Notation (JSON) format.

6. The method of claim 1, wherein the first and second accounts are linked based on issuance of an access token and a refresh token.

7. A first controller in a wireless local area network (WLAN) system of a smart home environment, the first controller comprising:
   a memory;
   a transceiver; and
   a processor being operatively connected to the memory and the transceiver,
   wherein the processor is configured to:
   perform a connection with a first cloud based on a first account;
   receive commissioning information for a controlee of a second controller based on the connection between the first cloud and a second cloud; and
   add commissioning for the controlee based on the commissioning information,
   wherein the second controller is connected to the second cloud based on a second account,
   wherein the first and second accounts are linked to each other, and
   wherein the commissioning information includes a manufacturer of the controlee, a model name, a device type, a supported function, a connected user account, firmware information, a standard specification version, a Universally Unique Identifier (UUID) of the second controller, an IP (Internet Protocol) address, a port number and a MAC address.

8. The first controller of claim 7, wherein the processor is further configured to:
   receive a permission message for access control of the controlee from the second controller; and
   control the controlee by executing an application based on the permission message
   wherein the first controller is set as a second manager of the controlee,
   wherein the second controller is set as a first manager of the controlee.

9. The first controller of claim 8, wherein the permission message includes information that the first controller receives the same authority for access control as the second controller or information that the first controller receives authority for access control set by the second controller.

10. The first controller of claim 7, wherein when the first controller is located outside a home and the controlee is located inside the home,
    the processor is further configured to:
    transmitting, by the first controller, a device search request message to the controlee;
    receiving, by the first controller, a device search response message from the controlee;
    transmitting, by the first controller, a device control request message to the controlee;
    receiving, by the first controller, a device control response message from the controlee;

transmitting, by the first controller, a subscription request message to the controlee; and receiving, by the first controller, a notification message for a subscription request from the controlee, wherein the device search request message, the device search response message, the device control request message, the device control response message, the subscription request message, and the notification message are transmitted and received based on the connection between the first and second clouds, wherein the notification message includes information that an event has occurred in the controlee.

11. The first controller of claim 10, wherein a protocol for transmitting the device control request message, the device control response message, the subscription request message, and the notification message is set to HyperText Transfer Protocol (HTTP), wherein Payloads of the device control request message, the device control response message, the subscription request message, and the notification message are set in JavaScript Object Notation (JSON) format.

12. The first controller of claim 7, wherein the first and second accounts are linked based on issuance of an access token and a refresh token.

* * * * *